United States Patent
Banerjee

(10) Patent No.: US 8,773,620 B2
(45) Date of Patent: Jul. 8, 2014

(54) OPTICAL FILM, SURFACE LIGHT SOURCE DEVICE, AND LIQUID CRYSTAL DISPLAY DEVICE

(75) Inventor: Saswatee Banerjee, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 283 days.

(21) Appl. No.: 13/443,222

(22) Filed: Apr. 10, 2012

(65) Prior Publication Data

US 2012/0293742 A1  Nov. 22, 2012

(30) Foreign Application Priority Data

Apr. 11, 2011 (JP) ................. P2011-087000

(51) Int. Cl.
*G02F 1/1333* (2006.01)
(52) U.S. Cl.
USPC ............................................................ 349/97
(58) Field of Classification Search
USPC ............................................................ 349/97
See application file for complete search history.

(56) References Cited

U.S. PATENT DOCUMENTS

| 5,828,488 A | 10/1998 | Ouderkirk et al. |
| 2012/0147315 A1* | 6/2012 | Ma .................................. 349/194 |
| 2013/0101816 A1* | 4/2013 | Liu et al. ......................... 428/212 |
| 2013/0170034 A1* | 7/2013 | Merrill et al. ............. 359/486.01 |

FOREIGN PATENT DOCUMENTS

JP    11509331 A    8/1999

* cited by examiner

*Primary Examiner* — Timothy L Rude
(74) *Attorney, Agent, or Firm* — Panitch Schwarze Belisario & Nadel LLP

(57) ABSTRACT

An optical film in accordance with one embodiment comprises a stack having a plurality of basic pairs each constructed by stacking first and second layers. The number of stacks, the refractive index difference $|\Delta n_j|$ in a predetermined direction between the first and second layers, the thicknesses of the first and second layers, and the number of basic pairs are set such that a reflection spectrum formed by the optical film conforms to a target reflection spectrum. The target reflection spectrum is a spectrum having a reflection peak region including a spectrum region having a reflectance of at least 50% within a predetermined wavelength width, in a reflection spectrum of a first polarized light in a wavelength range of 400 to 700 nm, while exhibiting a reflectance of 20% or less in a reflection spectrum of a second polarized light within the wavelength range.

12 Claims, 15 Drawing Sheets

Fig.3
(a)
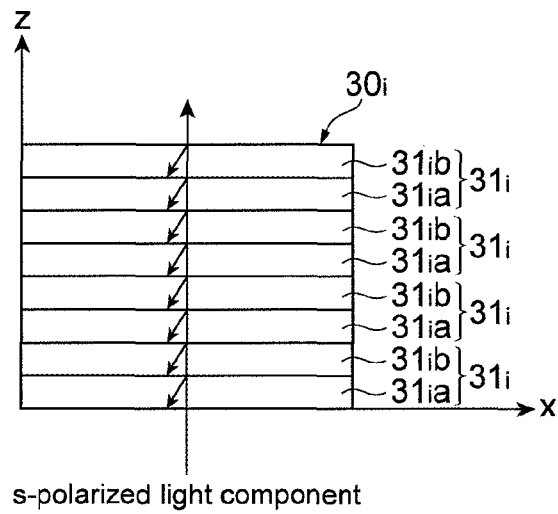
s-polarized light component
(b)
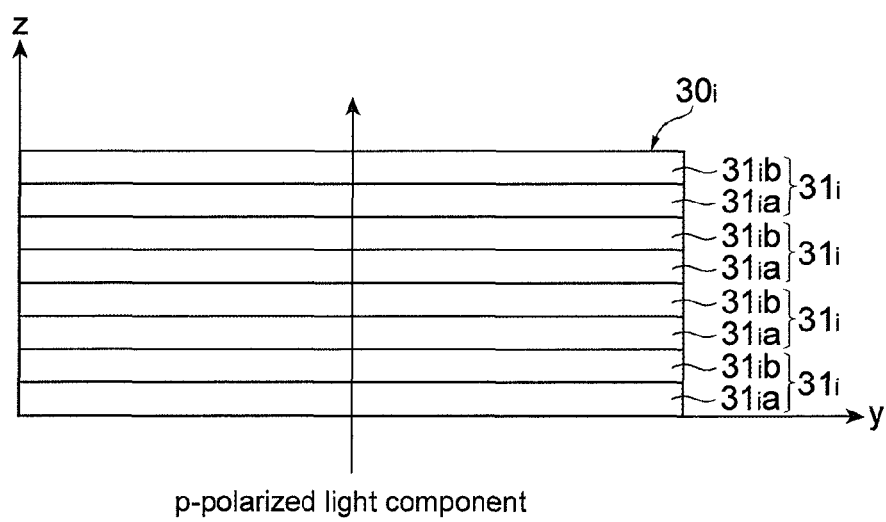
p-polarized light component

OPTICAL FILM, SURFACE LIGHT SOURCE DEVICE, AND LIQUID CRYSTAL DISPLAY DEVICE

BACKGROUND

1. Field

The present invention relates to an optical film, a surface light source device, and a liquid crystal display device.

2. Related Background Art

As an optical film having a function to enhance luminance when used in a liquid crystal display panel, a reflective polarizing optical film has been proposed (see Japanese Translated International Application Laid-Open No. 11-509331). This optical film is manufactured by alternately stacking 800 or more in total of an optical material layer composed of polyethylene naphthalate and an optical material layer composed of glycol-modified dimethyl cyclohexane terephthalate and stretching them.

The optical film has polarization separating and wavelength selectivity functions. In the visible light wavelength range of 400 to 700 nm, the optical film transmits therethrough 89.7% of light in a specific polarization direction and reflects a light polarized perpendicular to the former polarization direction. The variability of the transmittance of the optical film in the wavelength range of 400 to 700 nm is 1.05% and thus the optical film can uniformly transmit the visible light.

The optical film is disposed closer to an observer than is a light source of the liquid crystal display panel. In the light emitted from the light source, the optical film transmits therethrough a light component polarized parallel to the transmission axis of a polarizing plate on the backlight side of the liquid crystal display panel and reflects a light component polarized perpendicular thereto back to the backlight side. The light returned to the backlight side is emitted again to the observer with a partly changed polarization direction by a reflecting plate disposed on the opposite side of the light source from the observer. Hence, the light reflected with a partly changed polarization direction by the reflective part is reused (recycled), so that the polarized light component parallel to the polarization direction of the optical film is transmitted through the optical film and emitted from the screen of the transmissive liquid crystal display panel. Thus, the optical film exhibits a function to enhance the luminance of the liquid crystal display panel.

SUMMARY

From the viewpoint of environmental protection, three kinds of (e.g., red, green, and blue) light-emitting diodes have recently come into wider use as backlights for illuminating liquid crystal display panels. In this case, the backlight has higher intensity in the respective wavelength bands of the light components emitted from the light-emitting diodes. The liquid crystal display panel is typically equipped with a color filter, which has an optical characteristic such as a light absorption characteristic responding to the wavelength. Since wavelength dependency thus occurs in the liquid crystal display panel itself and the light illuminating the liquid crystal display panel, there has been a demand for an optical film which can enhance the luminance while taking account of such wavelength dependency.

It is an object of the present invention to provide an optical film functioning to enhance the luminance when used in a liquid crystal display device while having wavelength selectivity, and a surface light source device and a liquid crystal display device which include the optical film.

The optical film in accordance with one aspect of the present invention comprises at least one stack having a plurality of basic pairs each constructed by stacking first and second layers having respective refractive indexes in a predetermined direction different from each other. The number of stacks and the refractive index difference in the predetermined direction between the first and second layers, thicknesses of the first layer and the second layer, and number of basic pairs in each of the at least one stack are set such that a reflection spectrum by the at least one stack as a whole conforms to a target reflection spectrum. The target reflection spectrum has, at least one reflection peak region including a spectrum region having a reflectance of at least 50% and a wavelength width of 20 to 60 nm in a reflection spectrum of a first polarized light component polarized in a specific direction in a wavelength range of 400 to 700 nm, while exhibiting a reflectance of 20% or less in a reflection spectrum of a second polarized light component polarized in a direction orthogonal to the polarization direction of the first polarized light component in the wavelength range of 400 to 700 nm.

This optical film includes at least one stack, while the number of stacks and the refractive index difference in the predetermined direction between the first and second layers, thicknesses of the first layer and the second layer, and number of basic pairs in the stacks are set so as to have a reflection spectrum conforming to the above-mentioned target reflection spectrum. Therefore, when light is incident on the optical film, it selectively reflects the first polarized light, while transmitting the second polarized light therethrough. When such an optical film is employed in a liquid crystal display device, the first polarized light can be recycled, whereby the luminance can be enhanced.

In one embodiment, letting $n_{a,x}$ be the refractive index in a direction parallel to the polarization direction of the first polarized light within a plane of the first layer, and $n_{b,x}$ be the refractive index in a direction parallel to the polarization direction of the first polarized light within a plane of the second layer, $|\Delta n|=|n_{b,x}-n_{a,x}|$ may be at least 0.02 but 0.23 or less.

When $|\Delta n|$ falls within the range mentioned above, the first and second polarized lights can be separated from each other, while having the wavelength selectivity.

In one embodiment, letting $n_{a,y}$ be the refractive index in a direction parallel to the polarization direction of the second polarized light within the plane of the first layer, and $n_{b,y}$ be the refractive index in a direction parallel to the polarization direction of the second polarized light within the plane of the second layer, $|n_{b,y}-n_{a,y}|$ may be less than 0.02.

When $|n_{b,y}-n_{a,y}|$ is less than 0.02, the first and second polarized lights can be separated more reliably from each other.

In one embodiment, letting $n_{a,z}$ be the refractive index in a thickness direction of the first layer, and $n_{b,z}$ be the refractive index in a thickness direction of the second layer, $|n_{b,z}-n_{a,z}|$ may be less than 0.02.

In one embodiment, the number of basic pairs may be 25 to 50.

In one embodiment, the first and second layers may have a thickness of 5 to 400 nm each.

In one embodiment, the number of stacks may be at least the number of reflection peak regions in the reflection spectrum of the first polarized light component in the target reflection spectrum.

In this structure, the stacks are provided by a number not smaller than that of reflection peak regions, whereby at least one stack can be allocated to each reflection peak region. Hence, it will be sufficient if the stack is designed so as to generate its corresponding reflection peak region.

In one embodiment, the number of stacks may be 1 to 3.

In one embodiment, the reflection spectrum of the first polarized light in the target reflection spectrum may have one reflection peak region within the range of 430 to 480 nm, one reflection peak region within the range of 510 to 560 nm, and one reflection peak region within the range of 600 to 660 nm.

This makes it possible to selectively reflect respective wavelengths corresponding to blue, green, and red.

Another aspect of the present invention relates to a surface light source device. The surface light source device comprises a light source unit; a surface-light-emitting element for converting light from the light source unit into surface light and emitting the surface light from an exit surface part thereof; a reflective part, disposed on the opposite side of the surface-light-emitting element from the exit surface part, for reflecting the light from the surface-light-emitting element to the surface-light-emitting element while changing a polarization state of the light; and the optical film according to one aspect of the present invention, arranged on the exit surface part of the surface-light-emitting element, for receiving the surface light.

In this structure, the surface light emitted from the surface-light-emitting element impinges as incident light on the optical film. In the incident light, the second polarized light passes through the optical film. On the other hand, the first polarized light in the wavelength range of the reflection peak region is reflected back to the surface-light-emitting element. Thus returned light is emitted from the surface-light-emitting element to the reflective part and reflected by the reflective part, so as to impinge on the optical film through the surface-light-emitting element. The polarization state of the first polarized light component changes upon reflection by the reflective part, so that the light reflected by the reflective part includes the first polarized light and the second polarized light. Therefore, when the light reflected by the reflective part is incident on the optical film, the second polarized light in the incident light tends to pass through the optical film. Thus, the surface light source device can recycle the first polarized light reflected by the optical film. As a result, employing the surface light source device in a liquid crystal display device can improve the luminance. Since the first polarized light reflected by the optical film so as to be recycled has a wavelength range in the reflection peak region, the optical film emits a greater amount of light in the wavelength range of the reflection peak region. Therefore, by setting the reflection peak region according to the characteristic of the light source of the liquid crystal display device or the color filter, the luminance of light in a wavelength range more contributory to displaying images in the liquid crystal display device employing the surface light source device can be improved.

Still another aspect of the present invention relates to a liquid crystal display device. The liquid crystal display device comprises a light source unit; a surface-light-emitting element for converting light from the light source unit into surface light and emitting the surface light from an exit surface part thereof; a reflective part, disposed on the opposite side of the surface-light-emitting element from the exit surface part, for reflecting the light from the surface-light-emitting element to the surface-light-emitting element while changing a polarization state of the light; the optical film according to one aspect of the present invention, arranged on the exit surface part of the surface-light-emitting element, for receiving the surface light; and a liquid crystal panel arranged on the opposite side of the optical film from the surface-light-emitting element.

In this structure, the surface light emitted from the surface-light-emitting element impinges as incident light on the optical film. In the incident light, the second polarized light passes through the optical film. On the other hand, the first polarized light in the wavelength range of the reflection peak region is reflected back to the surface-light-emitting element. Thus returned light is emitted from the surface-light-emitting element to the reflective part and reflected by the reflective part, so as to impinge on the optical film through the surface-light-emitting element. The polarization state of the first polarized light changes upon reflection by the reflective part, so that the light reflected by the reflective part includes the first polarized light and the second polarized light. Therefore, when the light reflected by the reflective part is incident on the optical film, the second polarized light in the incident light passes through the optical film and irradiates the liquid crystal panel. Thus, the liquid crystal display device can recycle the first polarized light reflected by the optical film. As a result, the luminance of images displayed by the liquid crystal display device can be improved. Since the first polarized light reflected by the optical film so as to be recycled has a wavelength range in the reflection peak region, the optical film emits a greater amount of light in the wavelength range of the reflection peak region. Therefore, by setting the reflection peak region according to the characteristic of the light source of the liquid crystal display device or the color filter, the luminance of light in a wavelength range more contributory to displaying images in the liquid crystal display device can be improved.

BRIEF DESCRIPTION OF THE DRAWINGS

FIGS. 3(*a*) and 3(*b*) are diagrams schematically illustrating states of reflection and transmission of s- and p-polarized light components in one stack in which the x direction is taken as a specific direction;

DETAILED DESCRIPTION

Figure 1:
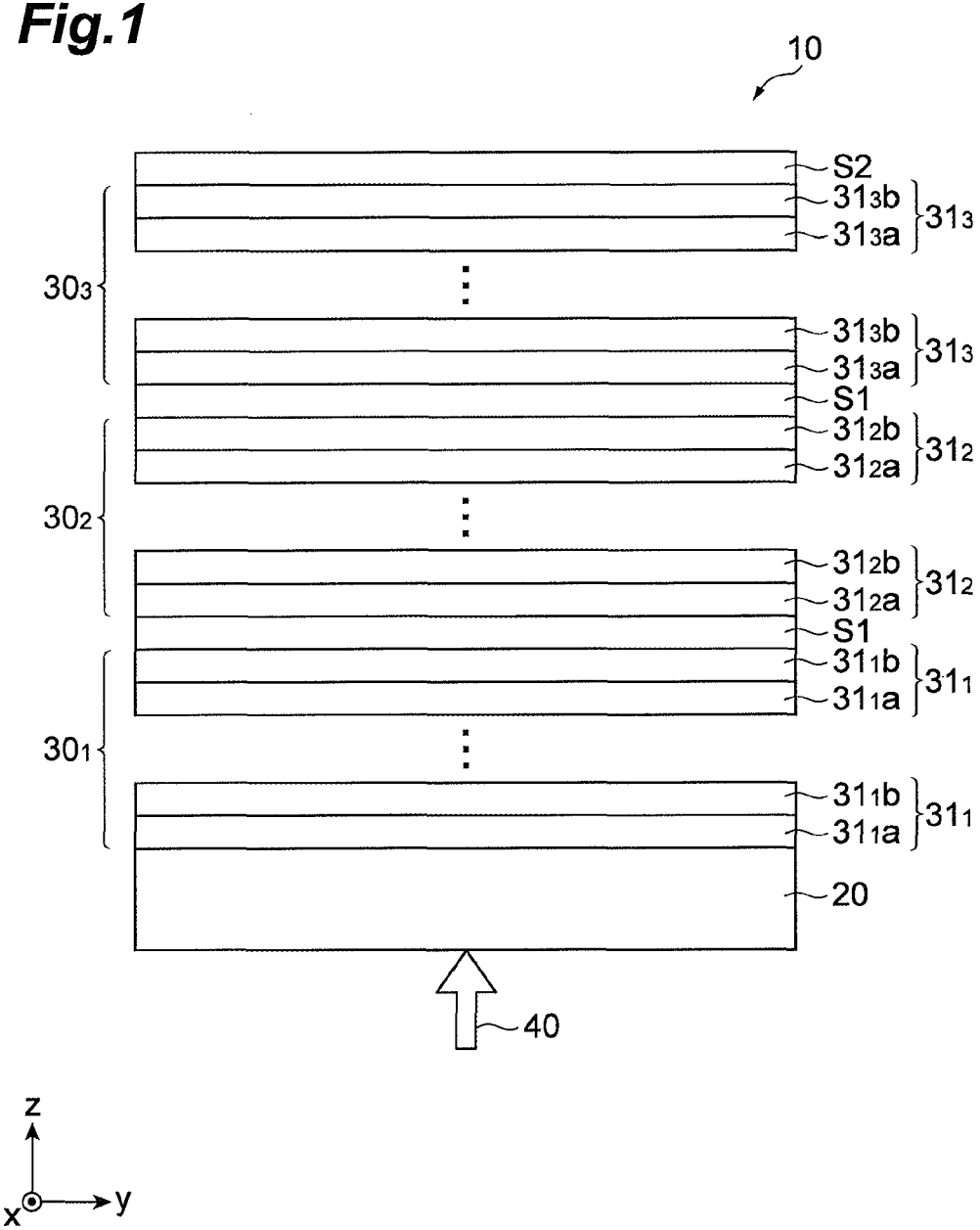
FIG. 1 is a schematic view for explaining a schematic structure of the optical film in accordance with an embodiment.

In the following, embodiments of the present invention will be explained with reference to the drawings. In the explanation of the drawings, the same constituents will be referred to with the same signs while omitting their overlapping descriptions. Proportions in the drawings do not always match those explained. Terms indicating directions such as "upper" and "lower" in the explanation are those used for convenience according to the states illustrated in the drawings.

FIG. 1 is a schematic view for explaining a schematic structure of the optical film in accordance with an embodiment. This optical film 10 is designed so as to exhibit a reflection spectrum conforming to a target reflection spectrum. The target reflection spectrum mainly reflects a first polarized light polarized in a specific direction in a predetermined wavelength range in a wavelength range of at least 400 nm but 700 nm or less and mainly transmits a second polarized light polarized in a direction orthogonal to the specific direction in the wavelength range of at least 400 nm but 700 nm or less. That is, the optical film 10 is a wavelength selective polarization separating film having polarization separating function and wavelength selectivity function. The optical film 10 can be employed in a liquid crystal display device, for example.

The structure of the optical film 10 will be explained in a mode where the predetermined wavelength range includes a blue wavelength range (i.e., 430 nm≤λ≤480 nm), a green wavelength range (i.e., 510 nm≤λ≤560 nm), and a red wavelength range (i.e., 600 nm≤λ≤660 nm) by way of example.

The optical film 10 has three stacks $30_1$, $30_2$, $30_3$. The stacks $30_1$, $30_2$, $30_3$ are layered on a substrate 20. Spacer layers S1, S1 may be disposed between the stack $30_1$ and the stack $30_2$ and between the stack $30_2$ and the stack $30_3$. A skin layer S2 may be disposed on the stack $30_3$ that is located at the highest position from the substrate 20. The substrate 20, spacer layers S1, and skin layer S2 may be used for protecting the optical material layers constituting the optical film 10 and/or enhancing the strength of the optical film 10. The substrate 20, spacer layers S1, and skin layer S2 may have such a structure as to hardly affect optical characteristics (wavelength selectivity and polarization separating function) of the optical film 10 in the wavelength range of 400 to 700 nm taken into consideration. In one embodiment, the substrate 20, spacer layers S1, and skin layer S2 may be composed of an isotropic material which is optically transparent to the above-mentioned wavelength range under consideration, for example. In one embodiment, example of the thickness of each of the substrate 20, spacer layers S1, and skin layer S2 can be a thickness sufficiently greater (e.g., several μm to several hundred μm) than the above-mentioned wavelength range or a thickness of $q\lambda_p/2$ (q is an integer of 1 or greater), where, $\lambda_p$ is a given wavelength within the wavelength range of 400 to 700 nm. In one embodiment, the refractive indexes of the substrate 20, spacer layers S1, and skin layer S2 are selected so as not to generate surface reflection and the like. An example of materials for the substrate 20, spacer layers S1, and skin layer S2 is polyethylene terephthalate (PET). The substrate 20, spacer layers S1, and skin layer S2 may be made of materials different from each other.

In the following explanation, the stacking direction of the stacks $30_1$, $30_2$, $30_3$ will be referred to as the z direction. Directions orthogonal to the z direction of the stacks $30_1$, $30_2$, $30_3$ will be referred to as x and y directions. The x and y directions are orthogonal to each other. The x and y directions are directions within a plane orthogonal to the z direction. In the following explanation, the first polarized light is assumed to be an s-polarized light component in incident light 40 to the optical film 10 unless otherwise specified. The x direction illustrated in FIG. 1 is assumed to be the polarization direction (electric field vibration direction) of the s-polarized light component. In this case, the y direction is the polarization direction (electric field vibration direction) of a p-polarized light component in the incident light 40.

Figure 2:
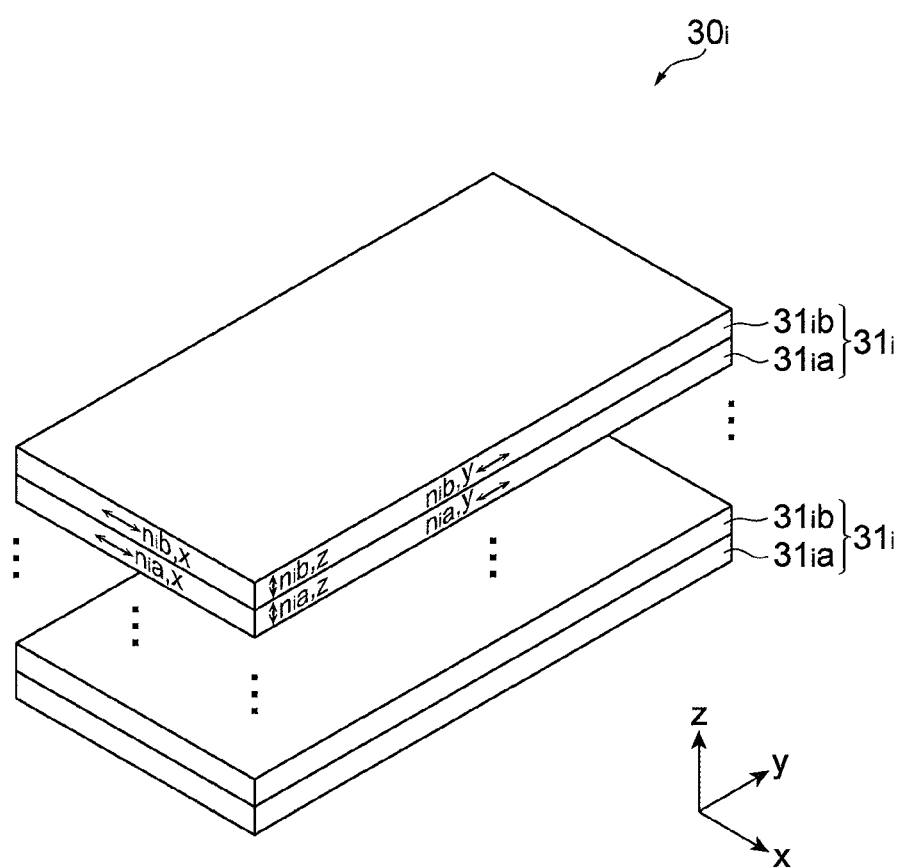
FIG. 2 is a perspective view of stacks in the optical film illustrated in FIG. 1.

The basic structure of the stacks $30_1$ to $30_3$, which are referred to as stacks $30_i$, will be explained with reference to FIGS. 1 and 2. Here, i is any of 1, 2, and 3. FIG. 2 is a perspective view schematically illustrating the structure of the stack $30_i$.

The stack $30_i$ has a plurality of basic blocks (basic pairs) $31_i$ in which a first optical material layer $31_i$a and a second optical material layer $31_i$b are stacked in the z direction. An example of the number of basic blocks (basic pairs) $31_i$ is at least 25 but 100 or less, preferably at least 25 but 50 or less. The stack $30_i$ is a multilayer body in which a plurality of basic blocks $31_i$ is stacked in the z direction. Therefore, in the stack $30_i$, the first optical material layer $31_i$a and the second optical material layer $31_i$b are stacked alternately. Letting 2M be the total of the number of first optical material layers $31_i$a and the number of second optical material layers $31_i$b in the stack $30_i$ (where M is an integer of 1 or greater), an example of 2M is at least 50 but 200 or less, preferably at least 50 but 100 or less. The number of basic blocks $31_1$ to $31_3$ or the total number of layers may vary among the stacks $30_1$ to $30_3$. The number of layers in the whole optical film 10 is preferably at least 150 but 500 or less.

In the x direction of the two directions (x and y directions) within a plane (xy plane) orthogonal to the thickness direction (z direction), the refractive indexes of the first and second optical material layers $31_i$a, $31_i$b differ from each other. Specifically, letting $n_i$a,x, $n_i$a,y, and $n_i$a,z be the respective refractive indexes of the first optical material layer $31_i$a in the x direction, the y direction, and the z direction, and $n_i$b,x, $n_i$b,y, and $n_i$b,z be the refractive indexes of the second optical material layer $31_i$b in the x direction, the y direction, and the z direction, $$n_i a,x \neq n_i b,x$$

holds.

In this case, the stack $30_i$ generates a refractive index difference for the first polarized light in which the x direction is the specific direction, i.e., the s-polarized light component in the incident light 40, but not for the p-polarized light component therein. As a result, the stack $30_i$ reflects the s-polarized light component but transmits the p-polarized light component therethrough.

FIG. 3(a) and FIG. 3(b) are diagrams schematically illustrating states of reflection and transmission of s-polarized light component and p-polarized light component in one stack. The number of first and second optical material layers $31_i$a, $31_i$b in the stack $30_i$ depicted in FIG. 3(a) and FIG. 3(b) is represented for convenience of illustration and does not always match other drawings.

As illustrated in FIG. 3(a), the s-polarized light component in the incident light 40 is partly reflected by an interface between the first optical material layers 31$_i$a and the second optical material layer 31$_i$b adjacent to each other. On the other hand, as illustrated in FIG. 3(b), the p-polarized light component in the incident light 40 advances through each basic block 31$_i$ in the z direction without being substantially reflected thereby. Hence, the stack 30$_i$ has a polarization separating function to reflect the s-polarized light component and transmit the p-polarized light component therethrough.

The first optical material layers 31$_i$a and the second optical material layers 31$_i$b will now be explained. Letting $|\Delta n_i| = |n_i a, x - n_i b, x|$ be the refractive index difference in the x direction between the first optical material layers 31$_i$a, and the second optical material layer 31$_i$b, $|\Delta n_i|$ is at least 0.02 but 0.23 or less (i.e., $0.02 \leq |\Delta n_i| \leq 0.23$), for example, preferably at least 0.02 but 0.15 or less (i.e., $0.02 \leq |\Delta n_i| \leq 0.15$). $n_i a, x$ may be greater than $n_i b, x$, or $n_i b, x$ may be greater than $n_i a, x$.

The materials for the first and second optical material layers 31$_i$a, 31$_i$b may not be restricted in particular as long as the materials for the first and second optical material layers 31$_i$a, 31$_i$b are transparent materials which can satisfy the condition concerning the refractive index difference mentioned above. From the viewpoint of easiness in processing, an example of materials for the first and second optical material layers 31$_i$a, 31$_i$b is a transparent resin. The material for each of the first and second optical material layers 31$_i$a, 31$_i$b can be selected from crystalline, semicrystalline, or amorphous polymeric materials. When one of the first and second optical material layers 31$_i$a, 31$_i$b is isotropic, while the other is anisotropic, the material for the isotropic optical material layer may preferably be selected from crystalline, semi crystalline, or amorphous polymeric materials, while the material for the anisotropic optical material layer may preferably be selected from crystalline or semicrystalline polymeric materials.

Specific examples of materials for the first and second optical material layers 31$_i$a, 31$_i$b include polyethylene naphthalate (PEN) and its isomers (e.g., 1,4-PEN, 1,5-PEN, 2,7-PEN, and 2,3-PEN), polyalkylene terephthalate (e.g., polyethylene terephthalate (PET), polybutylene terephthalate, and poly-1,4-cyclohexanedimethylene terephthalate), methacrylic resins (e.g., polymethylmethacrylate (PMMA)), polycarbonate resins, polystyrene resins, polyolefin resins (e.g., polystyrene and polypropylene, and the like), and cyclic polyolefin resins.

The material for each of the first and second optical material layers 31$_i$a, 31$_i$b may be copolymers of PEN, polyalkane terephthalate, or styrene. Examples of copolymers of PEN include those formed by 2,6-, 1,4-, 1,5-, 2,7-, and 2,3-naphthalene dicarboxylic acid or their esters with a) terephthalic acid or its esters, b) isophthalic acid or its esters, c) phthalic acid or its esters, d) alkane glycol, e) cycloalkane glycol (e.g., cyclohexane dimethanol diol), or f) alkane dicarboxylic acid (e.g., cyclohexane dicarboxylic acid). Examples of copolymers of polyalkane terephthalate include those formed by terephthalic acid or its esters with a) naphthalene dicarboxylic acid or its esters, b) isophthalic acid or its esters, c) phthalic acid or its esters, d) alkane glycol, e) cycloalkane glycol (e.g., cyclohexane dimethanol diol), f) alkane dicarboxylic acid, and g) cycloalkene dicarboxylic acid (e.g., cyclohexane dicarboxylic acid). Examples of copolymers of styrene include styrene-butadiene copolymers and styrene-acrylonitrile copolymers. The material of each of the first and second optical material layers 31$_i$a, 31$_i$b may be an ABS resin (acrylonitrile-butadiene-styrene copolymer resin) or MS (methylmethacrylate-styrene copolymer resin).

Each of the first and second optical material layers 31$_i$a, 31$_i$b may be a blend of two or more of the polymers or copolymers exemplified above. The materials exemplified above are preferred also because of their low absorption coefficient and small loss upon absorption.

Preferred combinations of the materials for the first and second optical material layers 31$_i$a, 31$_i$b include PEN/co-PEN, co-PEN/PEN, PET/co-PEN, co-PEN/PET, PEN/sPS, sPS/PEN, PET/sPS, sPS/PET, PEN/EASTER (registered trademark), EASTER/PEN, PET/EASTER, and EASTER/PET. By co-PEN is meant a copolymer or blend based on naphthalene dicarboxylate. EASTER is poly(cyclohexanedimethylene terephthalate). By sPS is meant syndiotactic polystyrene.

The materials for the first optical material layers 31$_1$a to 31$_3$a of the stacks 30$_1$ to 30$_3$ may be the same, while the materials for the second optical material layers 31$_1$a to 31$_3$a of the stacks 30$_1$ to 30$_3$ may be the same.

It will be sufficient if the materials for the first and second optical material layers 31$_i$a, 31$_i$b have the above-mentioned refractive index difference $|\Delta n_i|$. Therefore, for example, the first optical material layer 31$_i$a may be an isotropic optical material layer, while the second optical material layer 31$_i$b may be an anisotropic optical material layer. In this case, $n_i a, x = n_i a, y = n_i a, z$ ($= n_i a$), and $n_i a \neq n_i b, y \neq n_i b, z$. Examples of materials for the anisotropic optical material layer include birefringent liquid crystal polymers.

In a mode where the first optical material layer 31$_i$a is an isotropic optical material layer and the second optical material layer 31$ib$ is an anisotropic optical material layer, the first optical material layer 31$_i$a may be a material which does not generate a significant difference among the refractive indexes in the x, y, and z directions when processed under a necessary processing condition, while the material for the second optical material layer may be a material which greatly changes the refractive index in a predetermined direction under the processing condition.

From the viewpoint of more reliably separating the polarization, each of the refractive index difference in the y direction, $|\delta n_i y|$ ($= n_i a, y - n_i b, y|$), and the refractive index difference in the z direction, $|\delta n_i z|$ ($= |n_i a, z - n_i b, z|$), between the first and second optical material layers 31$_i$a, 31$_i$b is less than 0.02, more preferably 0.01 or less.

In the case where the first optical material layer 31$_i$a is an isotropic optical material layer and the second optical material layer 31$_i$b is an anisotropic optical material layer, the refractive index difference between any two of the x-, y-, and z-directional refractive indexes $n_i a, x$, $n_i a, y$, and $n_i a, z$ within the first optical material layer 31$_i$a is preferably 0 but may be 0.01 or less. In the anisotropic second optical material layer 31$_i$b, when $\delta n_i b_{yz}$ is defined as $|n_i b, y - n_i b, z|, \delta n_i byz$ is preferably less than 0.02, more preferably 0.01 or less. When $\Delta n_i b_{xy}$ is defined as $|n_i b, x - n_i b, y|$ and $\Delta n_i b_{zx}$ is defined as $|n_i b, z - n_i b, x|$, $|\Delta n_i b_{xy} - \Delta n_i b_{zx}|$ is preferably less than 0.02, more preferably 0.01 or less.

The thickness $t_i a$, $t_i b$ of each of the first and second optical material layers 31$_i$a, 31$_i$b in the z direction is sufficiently smaller than the lengths in the x and y directions of each of the first and second optical material layers 31$_i$a, 31$_i$b. That is, the forms of first and second optical material layers 31$_i$a, 31$_i$b are filmy. Each of the respective thicknesses $t_i a$, $t_i b$ in the z direction of the first and second optical material layers 31$_i$a, 31$_i$b is smaller than the wavelength $\lambda$ of the incident light 40 to the optical film 10. The example of each of the thicknesses $t_i a$, $t_i b$ is at least 5 nm but 400 nm or less, preferably at least 5 nm but 200 nm or less.

The thicknesses $t_ia$ of all the first optical material layers $31_ia$ are the same, while the thicknesses $t_ib$ of all the second optical material layers $31_ib$ are the same. The thicknesses $t_1a$ to $t_3a$ of the first optical material layers $31_ia$ in the stacks $30_1$ to $30_3$ differ, respectively, while the thicknesses $t_1b$ to $t_ab$ of the second optical material layers $31_ib$ in the stacks $30_1$ to $30_3$ differ, respectively. Thus, the following relationships hold.

$$t_1a \neq t_2a \neq t_3a.$$

$$t_1b \neq t_2b \neq t_3b.$$

Since the above-mentioned relationships concerning the thickness hold, the stacks $30_1$ to $30_3$ mainly have respective wavelength selectivities different from each other.

In the optical film 10, the stacks $30_i$ are designed to have such reflection spectrums that the optical film 10 attains a reflection spectrum conforming to a target reflection spectrum 50.

Figure 4:
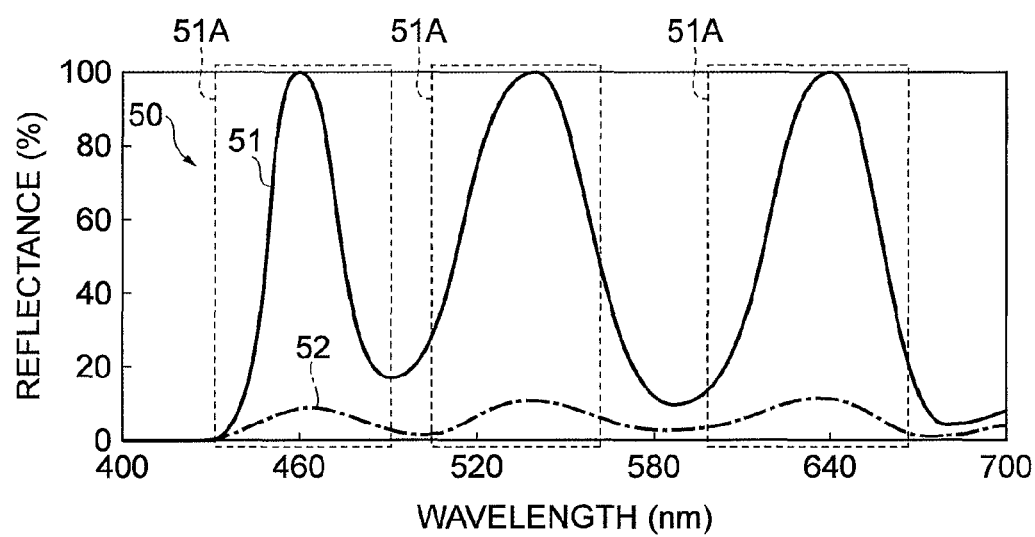
FIG. 4 is a chart illustrating an example of target reflection spectrums with respect to the optical film represented in FIG. 1.

The target reflection spectrum 50 will now be explained. FIG. 4 is a chart illustrating an example of target reflection spectrums with respect to the optical film 10 represented in FIG. 1. The abscissa of FIG. 4 represent wavelength (nm) and the ordinate represents reflectance (%). The target reflection spectrum 50 includes a reflection spectrum 51 for the s-polarized light component and a reflection spectrum 52 for the p-polarized light component. In the target reflection spectrum 50 illustrated in FIG. 4, the reflection spectrum 52 for the p-polarized light component is a spectrum whose reflectance R is 20% or less in the wavelength range of 400 to 700 nm. An example of the reflection spectrum 51 for the s-polarized light in the target reflection spectrum 50 has reflection peak regions 51A in the blue wavelength range, the green wavelength range, and the red wavelength range, respectively. As illustrated in FIG. 4, the reflection spectrum 51 has three large mountains as the reflection peak regions 51A.

The wavelength peak regions 51A include a spectrum region 51Aa having a reflectance of 50% or higher and a wavelength width of 20 to 60 nm. In the reflection peak regions 51A in one embodiment, the wavelength width of the spectrum region 51Aa can be set such that the wavelength corresponding to a reflection peak is located at the center between the shortest wavelength and the longest wavelength in the spectrum region 51Aa. The reflection peak regions 51A may be a region in the reflection spectrum 51 having a reflectance $R_1$, same as the maximum reflectance $R_{max}$, where η defined by the following expression becomes 50% or higher.

$$\eta = 100 \times (R_1 - R_2)/(R_1 + R_2).$$

In the above-mentioned expression defining $\eta_1$, $R_1$ is the reflectance of a reflection peak $P_1$ in a plurality of reflection peaks (tops of mountains) in the reflection spectrum 51. $R_2$ is the greater of the two minimum reflectances between the reflectance peak $P_1$ and the reflection peaks on the front and rear sides thereof in a direction in which the wavelength increases or decreases.

Figure 5:
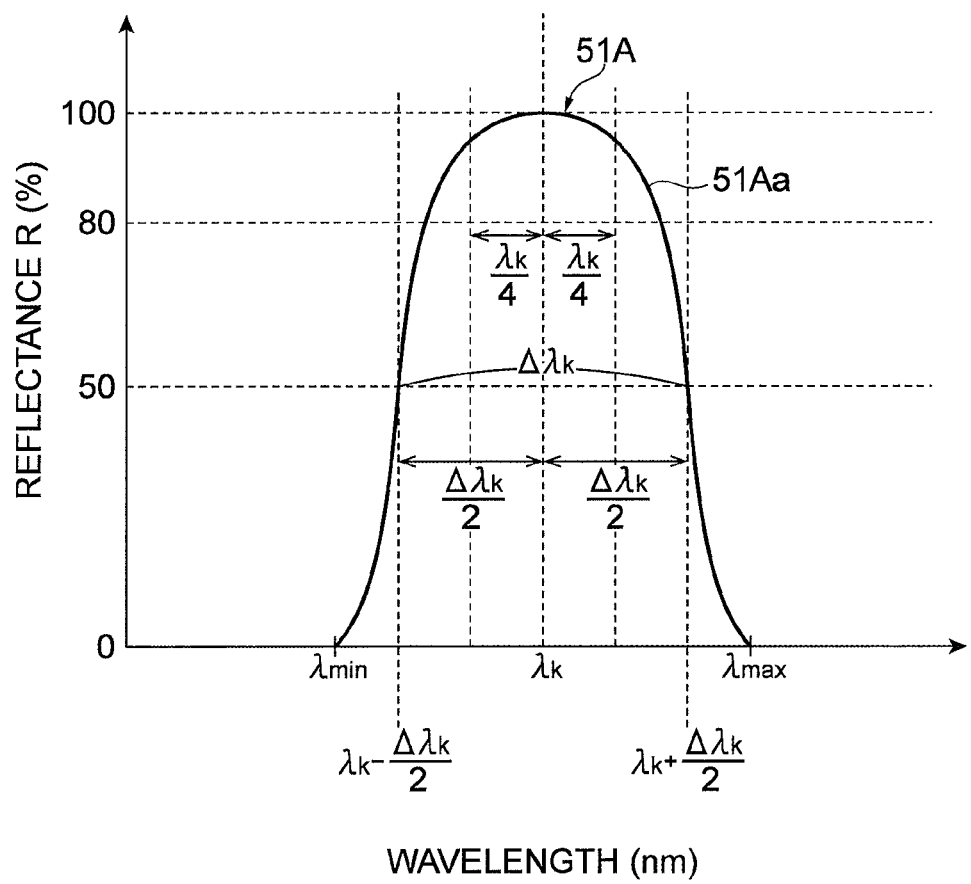
FIG. 5 is a schematic chart illustrating an example of reflection peak regions.

An example of forms of the reflection peak regions 51A will now be explained. FIG. 5 is a chart schematically illustrating an example of the reflection peak region 51A in one wavelength range. FIG. 5 is a schematic chart for explaining the form of the reflection peak region 51A. Let $\lambda_{min}$ be the shortest wavelength and $\lambda_{max}$ be the longest wavelength in one wavelength range. When the one wavelength range is the blue wavelength range, the green wavelength range, and the red wavelength range, an example of $\lambda_{min}$ is 430 nm, 510 nm, and 600 nm, respectively, and an example of $\lambda_{max}$ is 480 nm, 560 nm, and 660 nm, respectively. The peak wavelength corresponding to the maximum reflectance $R_{ma}$, ($R_{max}$=100% in FIG. 5 by way of example) within the reflection peak region 51A in the one wavelength range is referred to as $\lambda_k$.

In one embodiment, the reflection peak region 51A has a form satisfying the following condition 1.

$$R \geq 50\% \text{ for } [\lambda_k - (\Delta\lambda_k/2)] \leq \lambda \leq [\lambda_k + (\Delta\lambda_k/2)]. \quad \text{Condition 1:}$$

Preferably, the reflection peak region 51A has a form satisfying the following condition 2.

$$R \geq 80\% \text{ for } [\lambda_k - (\Delta\lambda_k/4)] \leq \lambda \leq [\lambda_k + (\Delta\lambda_k/4)]. \quad \text{Condition 2:}$$

In another embodiment, the reflection peak region 51A has a form satisfying the following condition 3.

$$R \geq 80\% \text{ for } [\lambda_k - (\Delta\lambda_k/2)] \leq \lambda \leq [\lambda_k + (\Delta\lambda_k/2)]. \quad \text{Condition 3:}$$

In the conditions 1 to 3, $\Delta\lambda_k$ is the wavelength width of the spectrum 51Aa and $\Delta\lambda_k$ is 20 to 60 nm. It is preferable that $\Delta\lambda_k$ is 20 to 45 nm. FIG. 5 illustrates an example of forms of the reflection peak region 51A satisfying the condition 1. Under the condition 1, $\Delta\lambda_k$ corresponds to the full width at half maximum. The condition 3 indicates that the reflectance of the spectrum region 51Aa is 80% or greater.

When the reflection peak region 51A has a mountain form with a sharper top, the luminance of light emitted from the optical film 10 can be improved. When reflection peak region 51A has a mountain form with a flatter top, i.e., a trapezoidal form, on the other hand, the wavelength selectivity in the optical film 10 can be improved.

FIG. 4 illustrates the target reflection spectrum 50 corresponding to the structural example of the optical film 10 represented in FIG. 1. However, the target reflection spectrum 50 may be any spectrum which has at least one reflection peak region 51A including the spectrum region 51Aa in the reflection spectrum 51 for the s-polarized light component (first polarized light) in the wavelength range of 400 to 700 nm while exhibiting the reflectance R of 20% or less in the reflection spectrum 52 for the p-polarized light component (second polarized light) in the wavelength range of 400 to 700 nm.

An example of methods for manufacturing the optical film in accordance with one embodiment will now be explained. When manufacturing the optical film, a target reflection spectrum is determined at first. The target reflection spectrum can be set as appropriate according to the use of the optical film to be manufactured as long as it is constituted by a reflection spectrum for the s-polarized light component (first polarized light) having at least one reflection peak region including a spectrum region having the reflectance R of 50% or greater and a wavelength width of 20 to 60 nm in the wavelength range of 400 to 700 nm and a reflection spectrum for the p-polarized light component (second polarized light) having the reflectance R of 20% or less within the wavelength range of 400 to 700 nm. When the manufactured optical film is employed in a liquid crystal display device, the target reflection spectrum may have a spectrum form corresponding to a characteristic of an emission spectrum of a light source of the liquid crystal display device or a spectrum form corresponding to an optical characteristic (e.g., light absorption characteristic) of a color filter in a liquid crystal panel, for example.

A case of manufacturing the optical film 10 corresponding to the target reflection spectrum 50 illustrated in FIG. 4 will now be explained by way of example. As mentioned above, the target reflection spectrum 50 has the reflection spectrum 51 having the reflection peak regions 51A in the wavelength ranges of three kinds of colors and the reflection spectrum 52 in which the reflectance R is 20% or less in the range of 400 to 700 nm. The form of the reflection spectrum is determined such that the reflection peak regions 51A satisfy any of the conditions 1 to 3.

Next, the number of stacks and the respective structures of the stacks are designed such as to yield a reflection spectrum corresponding to the target reflection spectrum 50. Since the reflection spectrum 51 of the target reflection spectrum 50 has the respective reflection peak regions 51A in the blue wavelength range, the green wavelength range, and the red wavelength range as illustrated in FIG. 4, the optical film 10 to be manufactured has three stacks 30₁ to 30₃ as represented in FIG. 1.

Methods for designing the refractive index difference $|\Delta_i|$ between the first and second optical material layers 31$_i$a, 31$_i$b in the polarization direction to be reflected (the x direction in this embodiment), thicknesses $t_i a$, $t_i b$ of the first and second optical material layers 31$_i$a, 31$_i$b, number of basic blocks 31$_i$, and the like in each stack 30$_i$ will now be explained.

The refractive index difference $|\Delta n_i|$, thicknesses $t_i a$, $t_i b$ of the first and second optical material layers 31$_i$a, 31$_i$b, and number of basic blocks 31$_i$ in each stack 30$_i$ affect the forms of the reflection spectrums 51, 52. Therefore, the refractive index difference $|\Delta n_i|$, thicknesses $t_i a$, $t_i b$ of the first and second optical material layers 31$_i$a, 31$_i$b, and number of basic blocks 31$_i$ in each stack 30$_i$ are designed such that the reflection spectrum 51 for the s-polarized light component exhibits the respective reflection peaks 51A in the blue wavelength range, the green wavelength range, and the red wavelength range, while the reflection spectrum 52 for the p-polarized light component exhibits the reflectance R of 20% or less in the wavelength range of 400 to 700 nm. The reflection spectrum 52 for the p-polarized light component may have any spectrum form, since it is only required that the reflectance is 20% or less in the wavelength range of 400 to 700 nm. While it is sufficient for the reflection spectrum 51 for the s-polarized light to have the respective reflection peak regions 51A in the wavelength regions of three kinds of colors, the respective forms of the reflection peak regions 51A in the wavelength ranges of the three kinds of colors can be designed so as to correspond to a desirable optical characteristic in the optical film 10. Preferably, the respective peak regions 51A in the wavelength ranges of three kinds of colors are designed so as to satisfy any of the above-mentioned conditions 1 to 3.

There are at least two methods for designing the structure of the stack 30$_i$ corresponding to the target reflection spectrum 50. The first one uses a quarter-wave method (see, for example, M. Born and E. Wolf, "Principle of Optics," 7th (expanded) edition, Cambridge U. Press, 1999), and another uses an optimization algorithm.

A method for designing the structure of the stack 30$_i$ corresponding to the target reflection spectrum 50 will now be explained. In the following explanation, a structure excluding the skin layer S2 from the structure illustrated in FIG. 1 will be employed as a design model. In the design, a component of the incident light 40 which is polarized in the x direction is the s-polarized light component. Further, in the design, within the planes of the first and second optical material layers 31$_i$a, 31$_i$b, the refractive indexes in the x direction are different from each other and the refractive indexes in the y direction are the same. The stacks 30₁ to 30₃ are designed so as to have the respective reflection peaks 51A in the blue wavelength range, the green wavelength range, and the red wavelength range. Hence, the reflection peak wavelength $\lambda_k$ and wavelength width $\Delta\lambda_k$ mentioned in the explanation of FIG. 5 will also be referred to as reflection peak wavelength $\lambda_i$ and wavelength width $\Delta\lambda_i$ corresponding to the stacks 30₁ to 30₃.

A method for designing the stacks 30₁ to 30₃ by using the quarter-wave method will now be explained. The quarter-wave method determines the respective refractive indexes $n_i a, x$, $n_i b, x$ of the first and second optical material layers 31₁a, 31$_i$b while taking account of the refractive index difference $|\Delta n_i|$ between the first and second optical material layers 31$_i$a, 31$_i$b in the x direction.

In general, as the refractive index difference $|\Delta n_i|$ becomes smaller, the s-polarized light component is harder to reflect in all the wavelengths. Therefore, $|\Delta n_i|$ has a given size or greater in order to achieve a function to separate polarization. As the refractive index difference $|\Delta n_i|$ becomes greater, the s-polarized light component is more likely to be reflected at all the wavelengths. Therefore, the wavelength selectivity tends to decrease when $|\Delta n_i|$ is too large. Hence, the refractive index difference $|\Delta n_i|$ is determined mainly from the viewpoint of polarization separating function in the target reflection spectrum while taking account of the wavelength selectivity. An example of the value of $\Delta n_i$ is at least 0.02 but 0.23 or less (i.e., $0.02 \leq |\Delta n_i| \leq 0.23$), preferably at least 0.02 but 0.15 or less (i.e., $0.02 \leq |\Delta n_i| \leq 0.15$). When $\Delta n_i$ falls within the range exemplified above, desirable forms of the reflection peak regions 51A are easier to design.

In the design, the reflection peak wavelength $\lambda_i$ of the reflection spectrum 51 for the s-polarized light component is determined. When the respective reflection peak regions 51A exist in the blue wavelength range, the green wavelength range, and the red wavelength range, $\lambda_1 = 460$ nm, $\lambda_2 = 540$ nm, and $\lambda_3 = 640$ nm may hold as illustrated in FIG. 4.

Next, the thicknesses $t_i a$, $t_i b$ of the first and second optical material layers 31$_i$a, 31$_i$b and the number of first and second optical material layers 31$_i$a, 31$_i$b in the stack 30$_i$ are determined according to the following expressions:

$$t_i a = \lambda_1 / (4 n_i a, x)$$

$$t_i b = \lambda_1 / (4 n_i b, x)$$

The refractive indexes in the y and z directions of the first and second optical material layers 31$_i$a, 31$_i$b can be determined according to the refractive index $n_i a, x$ and the refractive index $n_i b, x$.

Letting $R_{i,max}$ be the maximum reflectance in the reflection characteristic of the stack 30$_i$, the number of basic blocks 31$_i$ can be determined according to the maximum reflectance $R_{i,max}$. The number of basic blocks 31$_i$ may be the same or vary among the stacks 30₁ to 30₃. For example, the number of basic blocks 31$_i$ can be determined by using the following expression:

$$R_{i,max} = \left[ \frac{1 - \left(\frac{n_i a, x}{n_i b, x}\right)^N}{1 + \left(\frac{n_i a, x}{n_i b, x}\right)^N} \right]^2$$

In the above-mentioned expression indicating $R_{i,max}$, N is the sum of the number of the first and second optical material layers 31$_i$a, 31$_i$b in the stack 30$_i$. Hence, N=2M. In this case, the number of basic pairs 31$_i$ is N/2. The above-mentioned expression indicating $R_{i,max}$ assumes that the method of incidence of the incident light to the stack 30$_i$, is perpendicular incidence, $n_i a, x > n_i b, x$, and the light is incident on the stack 30$_i$ from and exits from the stack 30$_i$ to the same optical medium. The expression representing the maximum reflectance $R_{i,max}$ can be calculated as appropriate according to the type of incidence of the incident light, the refractive index of the surrounding medium, and the like.

The second designing method is one using the optimization algorithm for determining the thicknesses $t_i a$, $t_i b$ of the first and second optical material layers 31$_i$a, 31$_i$b and the number of first and second optical material layers 31$_i$a, 31$_i$b (i.e., the number of basic blocks $31_j$) in the stack $30_i$. The number of first and second optical material layers $31_i$a, $31_i$b can be determined according to the maximum reflectance $R_{i,max}$ in the reflection characteristic of the stack $30_i$ in the optimization algorithm too. The number of first and second optical material layers $31_i$a, $31_i$b in each stack $30_i$ may also become a parameter. However, from the viewpoint of reducing the number of parameters, it is preferred for the number of first and second optical material layers $31_i$a, $31_i$b, i.e., the number of basic blocks $31_i$, to be kept constant. The number of first and second optical material layers $31_i$a, $31_i$b in the stack $30_i$ is at least 50 but 200 or less, for example, while the total number of layers in the optical film 10 can be selected within the range of at least 150 but 500 or less.

Using the refractive index difference $|\Delta n_i|$ between the first and second optical material layers $31_i$a, $31_i$b and refractive indexes in the y direction and the z direction of the first and second optical material layers $31_i$a, $31_i$b and thicknesses $t_i$a, $t_i$b in each stack $30_i$ as parameters, the optimization algorithm performs a simulation, so as to optimize each parameter in conformity to the reflection peak region 51A and wavelength width $\Delta\lambda_i$ in each stack $30_i$. An example of the value of $\Delta n_i$ is at least 0.02 but 0.23 or less (i.e., $0.02 \leq |\Delta n_i| \leq 0.23$), preferably at least 0.02 but 0.15 or less (i.e., $0.02 \leq |\Delta n_i| \leq 0.15$), as mentioned above in the case using the optimization algorithm too.

In one embodiment, the optical film 10 can be designed while assuming that the materials of the first optical material layers $31_1$a to $31_3$a are the same and the materials of the second optical material layers $31_1$b to $31_3$b are the same, and one of the first and second optical material layers $31_i$a, $31_i$b is an isotropic optical layer and the other is an anisotropic optical material layer. This can further reduce the number of parameters.

When the materials of the first optical material layers $31_1$a to $31_3$a are the same, while the materials of the second optical material layers $31_1$b to $31_3$b are the same, it is unnecessary to distinguish the first optical material layers $31_1$a to $31_3$a from each other and the second optical material layers $31_1$b to $31_3$b from each other from the viewpoint of refractive index. Therefore, the refractive index of the each direction in the first optical material layers $31_1$a to $31_3$a will be referred to as na,x, na,y, and na,z. The same holds for the refractive index of each direction in the second optical material layers $31_1$b to $31_3$b. In the following, the same description will be used when it is unnecessary to distinguish the first optical material layers $31_1$a to $31_3$a from each other and the second optical material layers $31_1$b to $31_3$b from each other from the viewpoint of refractive index.

When the first optical material layers $31_1$a to $31_3$a are isotropic optical material layers composed of the same material, while the second optical material layers $31_1$b to $31_3$b are anisotropic optical material layers composed of the same material, the following two relational expressions (1) and (2) hold.

$$na,x = na,y = na,z (=na) \quad (1)$$

$$na = nb,y = nb,z \quad (2)$$

When these relationships hold, the number of parameters required for designing is 8. These are the refractive index na of the first optical material layer $31a$, the refractive index difference $|\Delta n|$ (=$|na,x-nb,x|$), and six thicknesses (two thicknesses $t_i$a, $t_i$b for each stack 30). Thus, when the relational expressions (1) and (2) hold, the number of parameters can be reduced as mentioned above.

It will be effective from the viewpoint of facilitating the designing if the materials of the first optical material layers $31_1$a to $31_3$a are the same and the materials of the second optical material layers $31_1$b to $31_3$b are the same, and one of the first optical material layer $31_i$a is an isotropic optical material layer and the other is an anisotropic optical material layer, when designing the stack $30_i$ by using the quarter-wave method too.

Thereafter, the optical film 10 is manufactured according to the designing condition of the optical film 10.

In the manufacture of the optical film 10, the refractive index difference $|\Delta n_i|$ may be formed by preparing each of the first and second optical material layers $31_i$a, $31_i$b that can exhibit the refractive index difference $|\Delta n_i|$ exemplified above, i.e., $0.02 \leq |\Delta n_i| \leq 0.23$.

Alternatively, when the first optical material layer $31_i$a is an isotropic optical material layer and the second optical material layer $31_i$b is an anisotropic optical material layer, the anisotropy of the second optical material layer $31_i$b may be provided by stretching the optical film 10 after forming the multilayer structure as the optical film 10, for example. In this case, the stretching direction becomes the x direction.

A method of manufacturing the optical film 10 in a mode where the first optical material layer $31_i$a is an isotropic optical material layer and the second optical material layer $31_i$b is an anisotropic optical material layer, will now be explained.

Materials for the first and second optical material layers $31_i$a, $31_i$b can be selected from the polymers and their copolymers exemplified above and the like. The material for the first optical material layer $31_i$a may be one which does not yield significant differences in the refractive indexes in the x, y, and z directions when processed under a necessary processing condition, while the material for the second optical material layer $31_i$b may be one which greatly changes the refractive index in a predetermined direction under the necessary processing condition. Preferably, the first and second optical material layers $31_i$a, $31_i$b have a similar rheological characteristic (e.g., melt viscosity) so as to be coextrudable.

The above-mentioned processing condition can be selected so as to yield a desirable refractive index relationship between the first and second optical material layers $31_i$a, $31_i$b. The desirable refractive index relationship can be achieved by various methods. An example of methods for attaining the desirable refractive index relationship is stretching a multilayer film structure to become the optical film 10 during the multilayer film structure or after forming the multilayer film structure as mentioned above (e.g., when the materials of the first and second optical material layers $31_i$a, $31_i$b are organic materials). The method for forming the multilayer film structure to become the optical film 10 includes multilayer extrusion (or coextrusion) (e.g., when the first and second optical material layers $31_i$a, $31_i$b are liquid crystal materials) and multilayer coating technologies. The multilayer coating technologies are not limited in particular, whereby typical techniques of multilayer coating technologies can be used. Examples of the multilayer coating technologies include wet process technologies such as spin coating and die coating and dry process technologies such as chemical vapor deposition and sputtering. From the viewpoint of easiness in manufacturing the optical film 10, multilayer extrusion is preferred. The optical film 10 may be manufactured by bonding stacks made separately.

In the case of the organic polymers which can be oriented by stretching, a multilayer film to become the optical film 10 is prepared by coextruding polymers constituting the layers so as to form a typical multilayer film. Thereafter, the multilayer film is stretched (uniaxially stretched) in a specific direction at a selected temperature, so as to orient the multilayer film, thereby the optical film 10 is yield. The above-mentioned specific direction corresponds to the x direction, which is the polarization direction of the s-polarized light component in the incident light 40. A step of heat-setting the multilayer film at the selected temperature may be provided after forming the multilayer film The extrusion and stretching may be performed in one step. The multilayer film may be relaxed in a direction orthogonal (perpendicular) to the stretching direction so that the multilayer film does not substantially decrease its length in this direction. For yielding the optical film 10 as a multilayer film having a desirable optical characteristic, the temperature before the stretching process, the stretching temperature, the degree of stretching, the stretch ratio, the heat-setting time, the heat-setting relaxation, and the stretching relaxation in the perpendicular direction can be selected. These variables are related to each other. For example, a relatively low degree of stretching can be employed at a relatively low stretching temperature. In general, the stretch ratio is preferably within the range of 1:2 to 1:10, more preferably within the range of 1:3 to 1:7.

The layers constituting the multilayer film to become the optical film 10 also include layers as the spacer layers S1 and skin layer S2. The multilayer film to become the optical film 10 may also include a layer to become the substrate 20. Though the multilayer film is explained as a multilayer structure to become the optical film 10, a multilayer structure to become each of the stacks $30_1$ to $30_3$ may also be a multilayer film. As illustrated in FIG. 1, the spacer layers S1 and skin layer S2 in the optical film 10 are useful when employing multilayer extrusion in the making of the optical film 10. Providing the spacer layers S1 and skin layer S2 can also improve mechanical characteristics in a step (e.g., stretching step) after forming the multilayer film structure, for example.

Though it is ideal that there is no refractive index difference between the first and second optical material layers $31_i a, 31_i b$ in the corresponding directions other than the predetermined direction (x direction), it will be sufficient if the refractive index difference in two directions (e.g., y and z directions) other than the predetermined direction is less than 0.02, more preferably 0.01 or less, as mentioned above.

As explained in the foregoing, the optical film 10 is manufactured according to the values designed so as to yield a reflection spectrum in conformity to the target reflection spectrum 50. As a result, the optical film 10 can reflect the s-polarized light component so as to exhibit a predetermined reflection spectrum with respect to the incident light 40 and substantially transmit therethrough all the p-polarized light component at least within the wavelength range of visible light. That is, the optical film 10 has a polarization separating function and wavelength selectivity. Employing the optical film 10 as such a wavelength selective polarization separating film in a liquid crystal display device can improve the luminance. This point will be explained with reference to FIG. 6.

Figure 6:
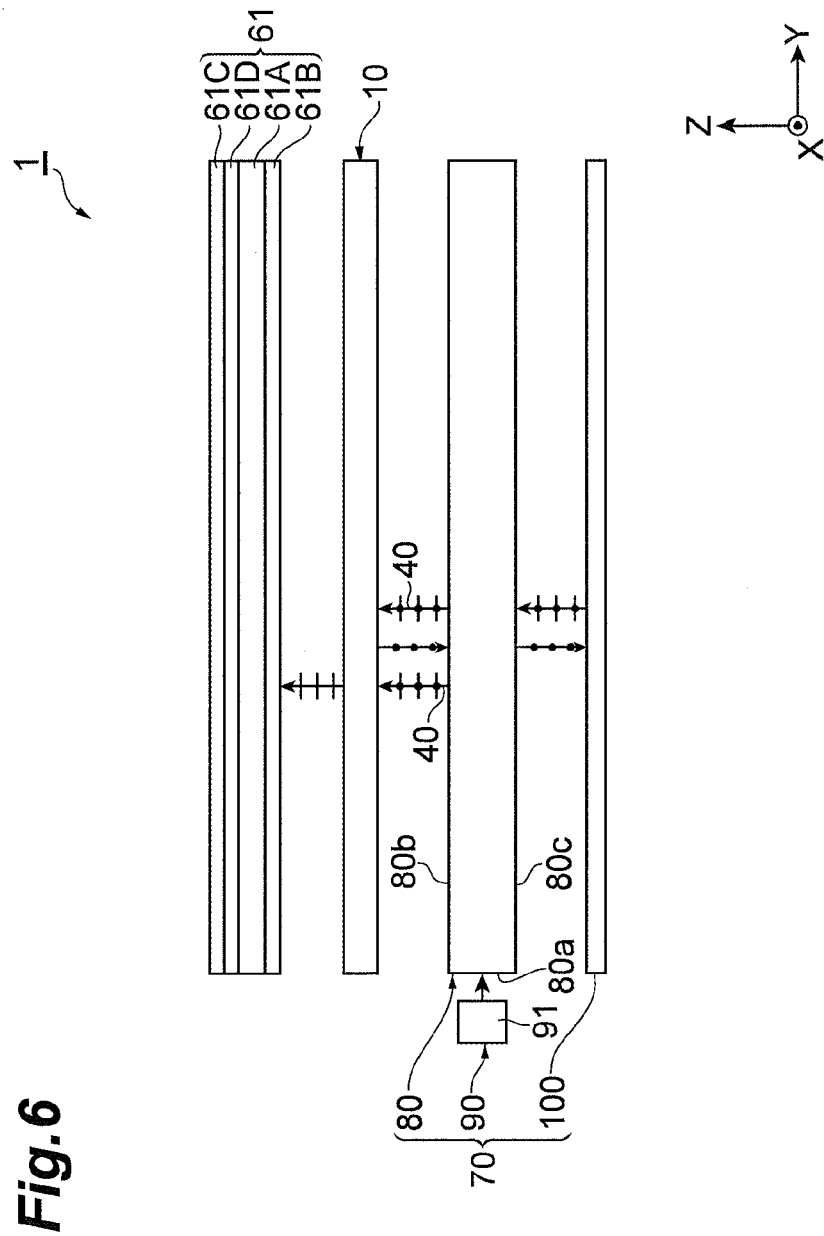
FIG. 6 is a schematic diagram of a liquid crystal display device employing the optical film illustrated in FIG. 1.

FIG. 6 is a diagram illustrating a schematic structure of a liquid crystal display device employing the optical film represented in FIG. 1. FIG. 6 illustrates a cross-sectional structure of a liquid-crystal display 1 in an exploded state.

The liquid crystal display 1 comprises a liquid crystal display panel (hereinafter simply referred to as liquid crystal panel) 61; a surface light source device 70, arranged on the rear face side of the liquid crystal panel 61 in FIG. 6, for emitting surface light; and the optical film 10 arranged between the liquid crystal panel 61 and the surface light source device 70. As illustrated in FIG. 6, the thickness direction of the liquid crystal panel 61 will be referred to as Z direction, while two directions orthogonal to the Z direction will be referred to as X and Y directions. In FIG. 6, light is schematically indicated by arrows. Black points attached to the arrows indicate the p-polarized light component, while line segments orthogonal to the extending direction of the arrows indicate the s-polarized light component.

The liquid crystal panel 61 is illuminated with light emitted from the surface light source device 70, so as to display an image. The liquid crystal panel 61 mainly comprises polarizing plates 61B, 61C disposed on both sides of a liquid crystal layer 61A. The polarizing plate 61B is arranged on the rear side of the liquid crystal layer 61A, while the polarizing plate 61C is arranged on the front side (observer side or viewer side) of the liquid crystal layer 61A. The polarizing plate 61B and the polarizing plate 61C are arranged such that their transmission axes are orthogonal to each other. In the mode illustrated in FIG. 6, the transmission axis of the polarizing plate 61B extends in the X direction illustrated in FIG. 6. A color filter layer 61D is arranged between the liquid crystal layer 61A and the polarizing plate 61C. The foregoing constituents of the liquid crystal panel 61 may have known structures. The liquid crystal panel 61 has a light distribution film, electrodes, and the like in addition to the constituents exemplified above. That is, the liquid crystal panel 61 may have a known structure.

The surface light source device 70 is an edge light type surface light source device comprising a light guide plate (surface-light-emitting element) 80, a light source unit 90 arranged near a side face 80a of the light guide plate 80, and a reflective part 100.

The light guide plate 80 propagates therethrough light incident thereon from the side face 80a while totally reflecting it between an exit surface part 80b intersecting (orthogonal to in FIG. 6) the side face 80a and a reflection surface part 80c located on the opposite side of the exit surface part 80b. When appropriate, a non-totally-reflecting region which reflects the light under a condition different from the total reflection condition is provided for the reflection surface part 80c. The non-totally-reflecting region may be a region provided with diffusion dots such as printed dots, a lens part extending in the y direction, and a dome-shaped lens part. The light reflected by the non-totally-reflecting region exits from the exit surface part 80b to the outside without being totally reflected by the exit surface part 80b. Since a part of the light propagating through the light guide plate 80 while being totally reflected is taken out from the exit surface part 80b, the light guide plate 80 emits surface light. The non-totally-reflecting region is typically arranged in such a pattern that the surface light attains a uniform luminance within a plane.

The light source unit 90 has a light source 91 arranged opposite to the side face 80a which is the entrance surface of the light guide plate 80. An example of the light source 91 is a point light source. Examples of the point light source include light-emitting diodes, halogen lamps, and tungsten lamps. Examples of the light-emitting diodes include RGB-type light-emitting diodes for emitting red light, green light, and blue light and white-type light-emitting diodes combining a blue-emitting diode with a yellow phosphor or green and red phosphors.

When the light source 91 is a point light source, the light source unit 90 contains a plurality of light sources 91. In this case, the plurality of light sources 91 is arranged linearly along a direction orthogonal to the thickness direction of the light guide plate 80 on the side face 80a. The light source 91 may be a linear light source such as a fluorescent tube without being restricted to the point light source.

In the surface light source device 70 illustrated in FIG. 6, the light source unit 90 is provided so as to oppose only one side face 80a among the four side faces of the light guide plate

80. However, this structure is not restrictive. For example, it will be sufficient if the light source unit 90 is provided for at least one of the side faces of the light guide plate 80.

To the light guide plate 80, the reflective part 100 reflects the light emitted from the reflection surface part 80c of the light guide plate 80. An example of the reflective part 100 is a reflective plate which randomly reflects the light. Another example of the reflective part 100 is a bottom face of a housing for accommodating the light guide plate 80 and the like, which is processed so as to randomly reflect the light.

The optical film 10 is a wavelength selective polarization separating film designed and manufactured based on the target reflection spectrum 50 illustrated in FIG. 4. When the optical film 10 is employed in the liquid crystal display device 1, the optical film 10 is arranged such that the direction in which the refractive index difference $|\Delta n_x|$ occurs between the first and second optical material layers $31_i a$, $31_i b$ is the X direction illustrated in FIG. 6.

In the structure mentioned above, the surface light emitted from the exit surface part 80b of the light guide plate 80 impinges as the incident light 40 on the optical film 10. The optical film 10 reflects the incident light 40 in conformity to the target reflection spectrum in the incident light 40. As a result, in the incident light 40, the p-polarized light component substantially passes through the optical film 10, while the s-polarized light component in the blue wavelength range, the green wavelength range, and the red wavelength range is selectively reflected.

The s-polarized light component reflected by the optical film 10 returns to the light guide plate 80, so as to be emitted from the reflection surface part 80c to the reflective part 100. The reflective part 100 randomly reflects the light from the light guide plate 80 back to the light guide plate 80. The polarization state of the light is disturbed by the random reflection by the reflective part 100. The light with the disturbed polarization state is emitted again from the light guide plate 80, so as to impinge as the incident light 40 on the optical film 10. As a result, the s-polarized light component in the incident light 40 is reflected and the p-polarized light component is transmitted.

As explained in the foregoing, in the liquid crystal display device 1 equipped with the optical film 10, the s-polarized light component in the blue wavelength range, the green wavelength range, and the red wavelength range each of which is a predetermined wavelength range is recycled. In this case, the light absorbed by the polarizing plate 61B decreases, while the liquid crystal panel 61 is illuminated by using the recycled light. As a result, the luminance of images displayed by the liquid crystal panel 61 improves. In this regard, the optical film 10 is a luminance improving film.

Figure 7:
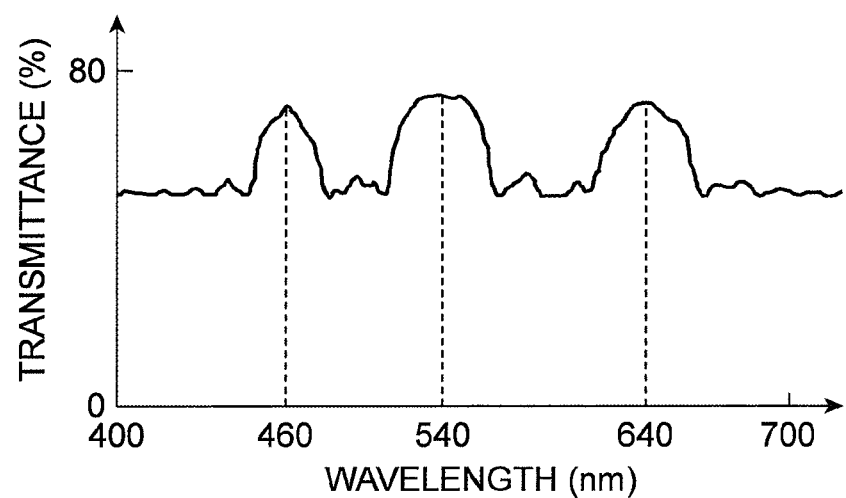
FIG. 7 is a chart schematically illustrating an example of transmission spectrums of light transmitted through the optical film.

Since the s-polarized light component in the blue wavelength range, the green wavelength range, and the red wavelength range each of which is a predetermined wavelength range is recycled by the optical film 10, the p-polarized light component in the predetermined wavelength range is transmitted therethrough by a greater amount as illustrated in FIG. 7. In this case, the optical film 10 improves the luminance while having the wavelength selectivity, thereby the optical film 10 has a function for enhancing chroma too.

Dyes have conventionally been used for the color filter layer 61D. In this case, light transmittance may be insufficient, whereby the chrome enhancing effect tends to be low. Using the optical film 10, by contrast, can selectively augment the light in a predetermined wavelength range, whereby the chroma can be enhanced as mentioned above.

When using an RGB-type light-emitting diode for emitting red light, green light, and blue light or a white-type light-emitting diode combining a blue-emitting diode with a yellow phosphor or green and red phosphors, it is preferred for the target reflection spectrum 50 at the stage of designing the optical film 10 to conform to the emission characteristic of the light source unit 90 from the viewpoint of improving the chroma. Alternatively, it is preferred for the target reflection spectrum 90 to be a spectrum in conformity to a characteristic (absorption wavelength or the like) of the color filter layer 61 from the viewpoint of improving the chroma.

Since the respective thicknesses $31_i a$, $31_i b$ of the first and second optical material layers $31_i a$, $31_i b$ are constant in each stack $30_i$, the optical film 10 is easy to manufacture. Since the total number of the first and second optical material layers $31_i a$, $31_i b$ is at least 50 but 500 or less in each stack $30_i$, the optical film 10 can be manufactured more easily and less expensively.

EXAMPLES

In the following, although the present invention will be explained in further detail with reference to examples, the present invention is not restricted to the following examples. Various calculations for designing the optical films in accordance with the examples were performed by computer programs assembled by using Fortran 90 and Mathcad (versions 11 and 15). In the explanation of the examples, constituents corresponding to those described in the embodiments will be referred to with the same signs.

The following points were assumed in the design.

(1) In the design model of the optical film 10, the structure of FIG. 1 and the x, y, and z directions illustrated in FIG. 1 are employed. However, in the design model, the optical film does not include the skin layer S2 illustrated in FIG. 1.

(2) The optical film 10 comprises three stacks $30_1$, $30_2$, $30_3$, spacer layers S1 for separating the stacks $30_1$ to $30_3$ from each other, and a substrate 20.

(3) The first optical material layers $31_1 a$ to $31_3 a$ of the stacks $30_1$ to $30_3$ are constituted by the same polymer. Similarly, the second optical material layers $31_1 b$ to $31_3 b$ of the stacks $30_1$ to $30_3$ are constituted by the same polymer. Thus, it is unnecessary to distinguish the refractive indexes of the first optical material layers $31_1 a$ to $31_3 a$ from each other and the refractive indexes of the second optical material layers $31_1 b$ to $31_3 b$ from each other in terms of refractive index. Therefore, in the following, 1, 2, and 3 for distinguishing the stacks $30_1$, $30_2$, $30_3$ from each other will be omitted from the descriptions concerning the refractive index.

(4) The first optical material layer $31_i a$ (where i is any of numbers 1, 2, and 3) is an isotropic optical material layer, while the second optical material layer $31_i b$ is an anisotropic optical material layer.

(5) The refractive index in the x direction differs between the first and second optical material layers $31_i a$, $31_i b$. The refractive indexes in the y and z directions of the second optical material layers $31_i b$ are the same as those of the first optical material layer $31_i a$. Hence, letting na (=na,x=na,y=na,z) be the refractive index of the first optical material layer $31_i a$, which is an isotropic optical material layer, the following expression holds.

$$na=nb,y=nb,z.$$

(6) It is assumed that the type of incidence to the stack $30_i$ is normally incidence.

Figure 8:
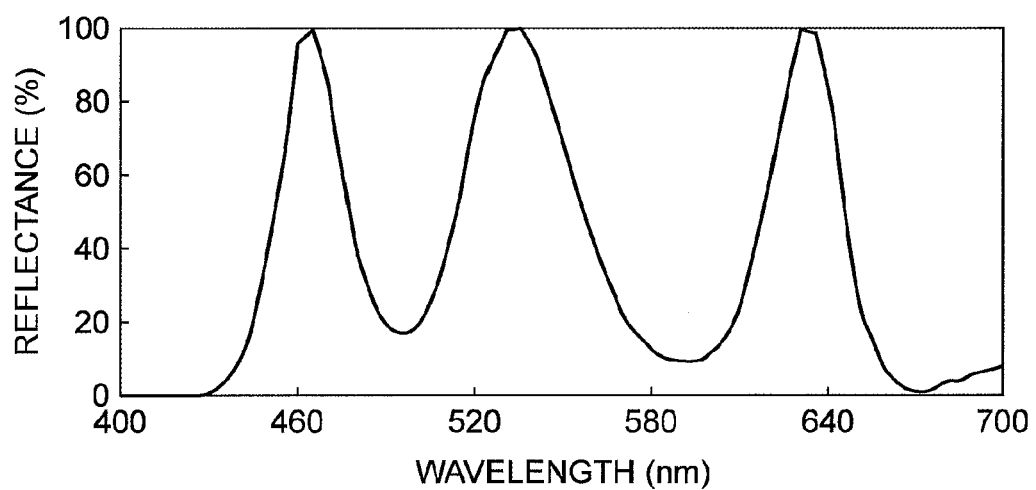
FIG. 8 is a chart illustrating an example of reflection spectrums with respect to the first polarized light of the target reflection spectrum in the Examples.

(7) As the reflection spectrum 51 for the s-polarized light component in the predetermined target reflection spectrum 50 for designing, the LED emission spectrum illustrated in FIG. 8 is assumed. In the reflection spectrum 51, three reflection peak positions corresponding to blue (B), green (G), and red (R) regions in visible light are assumed to be 462.5 nm, 532.5 nm, and 632.5 nm, respectively. The reflection spectrum 52 for the p-polarized light component may have any spectrum form as long as the reflectance in the wavelength range of 400 to 700 nm is 20% or less and thus is not illustrated in FIG. 8.

According to the foregoing assumptions (1) to (7), parameters for designing are expressed by the following signs:

$$na, \Delta n, t_1 a, t_1 b, t_2 a, t_2 b, t_3 a, t_3 b$$

In these descriptions, a and b are used for distinguishing two kinds of polymers of the first and second optical material layers 31$_i$a, 31$_i$b, which are basic optical material layers, from each other. By na is meant the refractive index of the first optical material layer 31$_i$a. By $\Delta n$ is meant the value of refractive index difference in the x direction between the first and second optical material layers 31$_i$a, 31$_i$b. The numbers 1 to 3 are used for distinguishing the three stacks 30$_1$, 30$_2$, 30$_3$ from each other. For example, $t_1 a$, $t_1 b$, $t_2 a$, $t_2 b$, $t_3 a$, $t_3 b$ indicate the respective thicknesses of the two optical material layers (first and second optical material layers 31$_i$a, 31$_i$b) in the basic optical material layer pairs (basic blocks) of the stacks 30$_1$, 30$_2$, 30$_3$.

The minimum values of the parameters are typically as follows: na=1.45, $\Delta n$=0.02, $t_1 a$=5 nm, $t_1 b$=5 nm, $t_2 a$=5 nm, $t_2 b$=5 nm, $t_3 a$=5 nm, $t_3 b$=5 nm. The maximum values of the parameters are typically as follows: na=1.75, $\Delta n$=0.15, $t_1 a$=205 nm, $t_1 b$=205 nm, $t_2 a$=205 nm, $t_2 b$=205 nm, $t_3 a$=205 nm, $t_3 b$=205 nm. The accuracy for the parameters is typically 0.001 for na, 0.001 for $\Delta n$, 0.01 nm for $t_1 a$, 0.01 nm for $t_1 b$, 0.01 nm for $t_2 a$, 0.01 nm for $t_2 b$, 0.01 nm for $t_3 a$, and 0.01 nm for $t_3 b$.

Example 1

In Example 1, the optical film 10 was designed by using the quarter-wave method with respect to the predetermined target reflection spectrum 50. The optical film 1 of Example 1 is constituted by three stacks 30$_1$, 30$_2$, 30$_3$ placed on the substrate 20 having a refractive index of 1.5. Each stack 30$_i$ is constructed by stacking 30 pairs of isotropic material layer (first optical material layer 31$_i$a) and anisotropic optical material layer (second optical material layers 31$_i$b). Specific values of na and nb,x are 1.7 and 1.6, respectively, in each of the stacks 30$_1$, 30$_2$, 30$_3$, for example. The thicknesses $t_i a$, $t_i b$ of the first and second optical material layers 31$_i$a, 31$_i$b calculated by using the quarter-wave method are as follows: $t_1 a$=67.65 nm, $t_1 b$=71.88 nm, $t_2 a$=79.41 nm, $t_2 b$=84.38 nm, $t_3 a$=94.12 nm, $t_3 b$=100.00 nm. The stacks 30$_i$ adjacent to each other are separated from each other by a spacer layer S1 which is an optical material layer having a refractive index of 1.5 and a thickness of 270 nm (=540 nm/2). The reflection spectrum was calculated for p- and s-mode light components (p- and s-light components) which are normally incident lights having respective polarization directions perpendicular to each other. The electric field in the p mode is polarized within the incident plane (yz plane in FIG. 2), while the electric field in the s mode is polarized within a plane (xy plane in FIG. 2) perpendicular to the incident plane. The reflection spectrum for the optical film 10 was calculated by sampling the wavelength at 60 points within the range from 400 nm to 700 nm. The medium from which the light was incident on the optical film 10 was assumed to be the air having a refractive index of 1.0.

Figure 9:
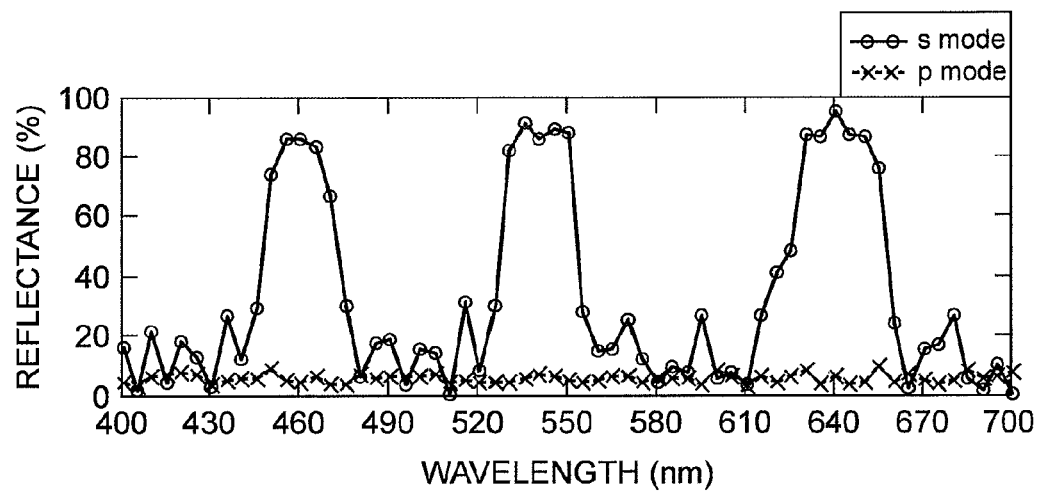
FIG. 9 is a chart illustrating a change in reflectance with respect to wavelength (spectrum) in the optical film designed in Example 1.

FIG. 9 illustrates a change in reflectance with respect to wavelength (spectrum) in the optical film 10 constituted by 182 optical material layers (including 2 spacer layers S1) in total calculated by using the quarter-wave method. The abscissa of FIG. 9 indicates wavelength (nm) and the ordinate is reflectance (%).

Figure 10:
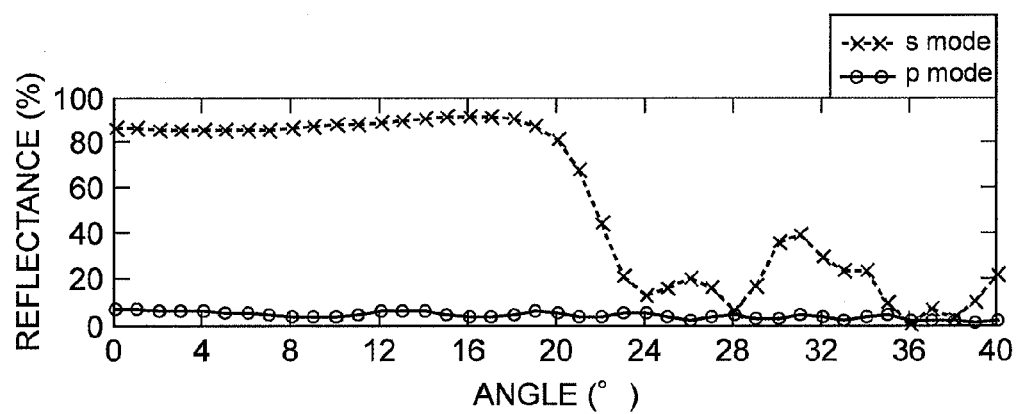
FIG. 10 is a chart illustrating an angle spectrum of reflectance in the optical film designed in Example 1.

FIG. 10 illustrates an angle spectrum of reflectance calculated at angular intervals of 1° in each of the two perpendicular modes mentioned above. The abscissa of FIG. 10 indicates angle (°) and the ordinate is reflectance (%). The angle in the abscissa corresponds to the angle of incidence. FIG. 10 is an angle spectrum with respect to a wavelength of 540 nm. This chart shows that the reflectance of the optical film 10 in each of two polarization modes is constant at an angle (angle of incidence) of 18° or less and that the two polarization modes (s mode and p mode) can be separated from each other more reliably there. That is, it is understood that the optical film 10 has a polarizing function more reliably as the state of incidence of the light on the optical film 10 is closer to perpendicular incidence.

Example 2

Figure 11:
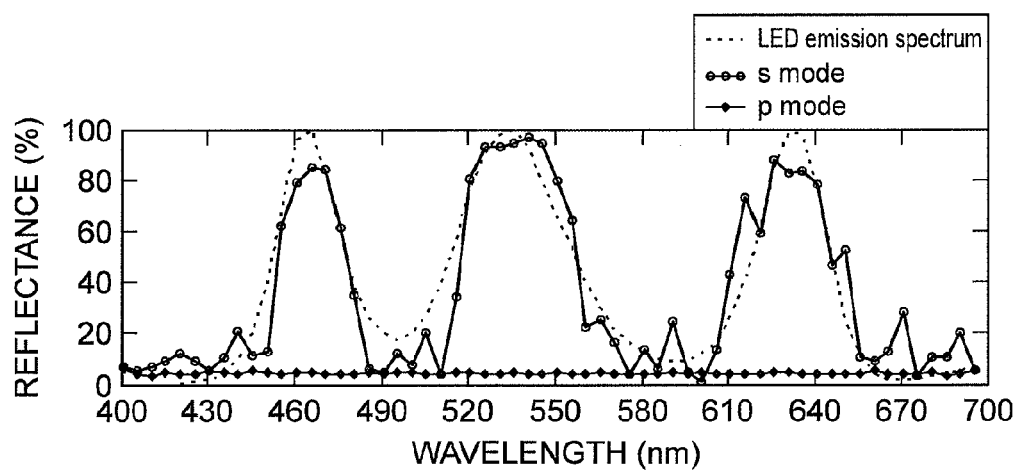
FIG. 11 is a chart illustrating a change in reflectance with respect to wavelength (spectrum) in the optical film designed in Example 2.

The optical film 10 was designed by using the optimization algorithm with respect to the predetermined target reflection spectrum 50. FIG. 11 illustrates a spectrum of wavelength dependency of reflectance in the optical film having the structure designed by using the optimization algorithm. The abscissa and ordinate of FIG. 11 are the same as those of FIG. 9. A broken line in FIG. 11 illustrates the emission spectrum of the LED represented in FIG. 8.

The values of optimized design parameters were as follows: na=1.528, refractive index difference $\Delta n$=0.148, $t_1 a$=28.13 nm, $t_1 b$=121.84 nm, $t_2 a$=94.57 nm, $t_2 b$=71.40 nm, $t_3 a$=143.00 nm, $t_3 b$=48.36 nm. In the design, the number of optical material layers (the sum of the number of the first optical material layer and the number of the second optical material layer) in each of three stacks 30$_1$, 30$_2$, 30$_3$ was 50. The refractive index of the substrate 20 and spacer layers S1 was 1.5 as in Example 1.

Figure 12:
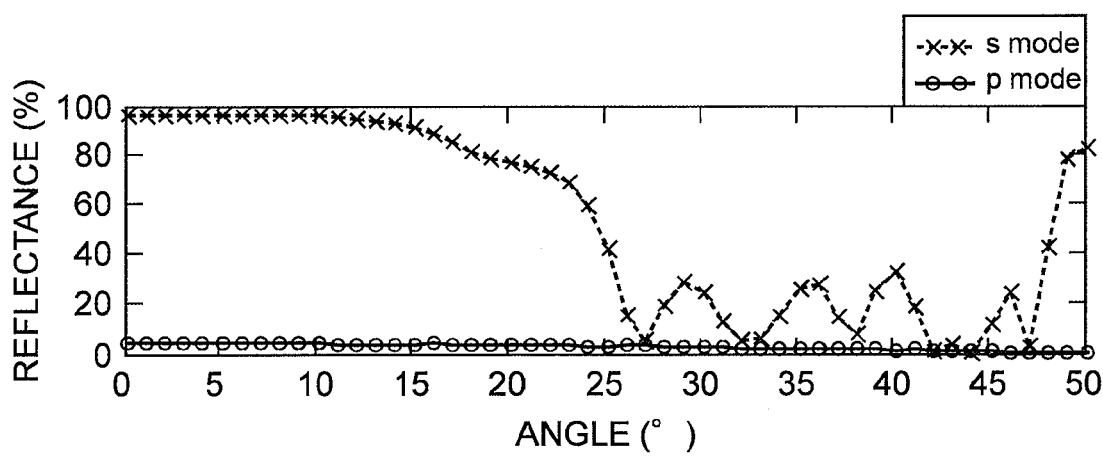
FIG. 12 is a chart illustrating an angle spectrum of reflectance in the optical film designed in Example 2.

FIG. 12 illustrates a spectrum of angle dependency of reflectance in the optical film 10 of FIG. 11. FIG. 12 shows that the reflectance in each of both polarization modes is constant from 0° to about 10° and that the polarizations can be separated more reliably there. The abscissa and ordinate of FIG. 12 are the same as those of FIG. 10.

Example 3

Figure 13:
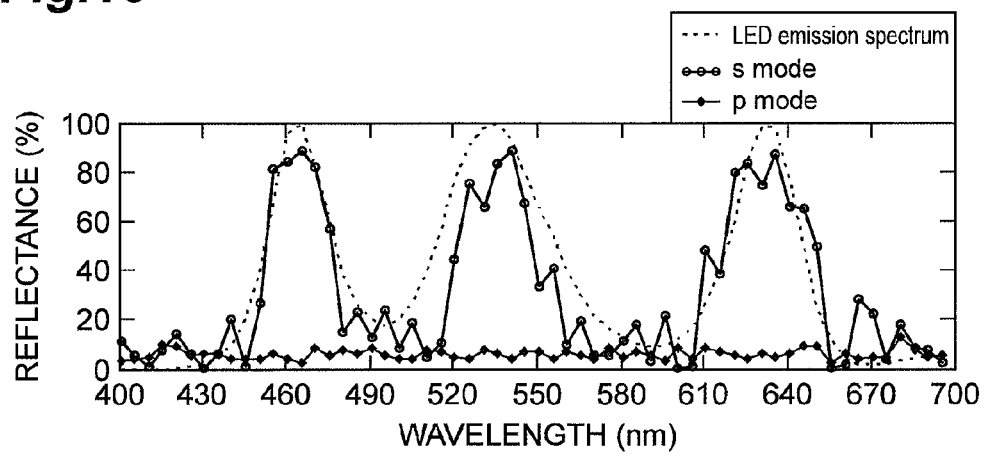
FIG. 13 is a chart illustrating a change in reflectance with respect to wavelength (spectrum) in the optical film designed in Example 3.

Optimization was performed by using the optimization algorithm as in Example 2 except that the refractive index difference $\Delta n$ was restricted to the range of greater than 0 and less than 0.1. FIG. 13 illustrates a reflection spectrum of the optical film 10 having the optimized structure obtained by this method. The values of optimized design parameters were as follows: na=1.626, refractive index difference $\Delta n$=0.100, $t_1 a$=79.84 nm, $t_1 b$=57.53 nm, $t_2 a$=68.30 nm, $t_2 b$=92.10 nm, $t_3 a$=102.50 nm, $t_3 b$=84.50 nm. As in FIG. 11, a broken line in FIG. 13 illustrates the emission spectrum of the LED represented in FIG. 8.

FIG. 13 shows that even relatively small $\Delta n$ can adapt to a target spectrum.

Figure 14:
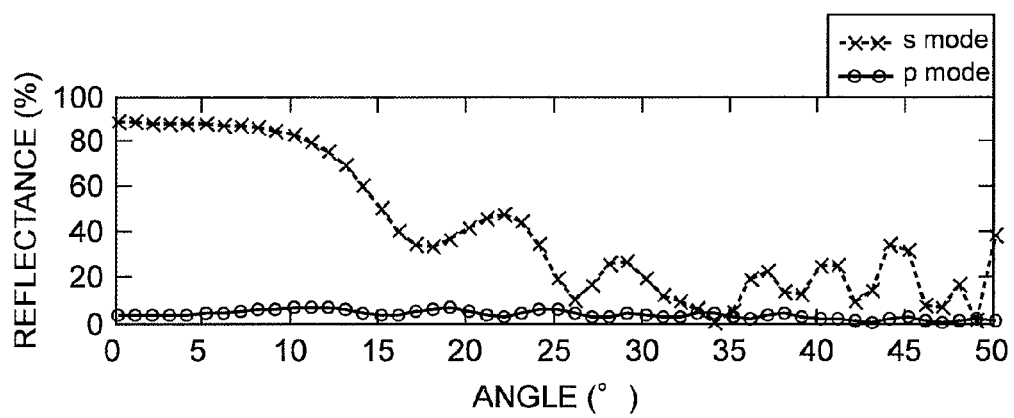
FIG. 14 is a chart illustrating an angle spectrum of reflectance in the optical film designed in Example 3.

FIG. 14 illustrates a spectrum of angle dependency of reflectance in the optical film 10 of FIG. 13. The abscissa and ordinate of FIG. 14 are the same as those in FIG. 10. FIG. 14 shows that the reflectance in each of both polarization modes is constant from 0° to about 10° and that the polarizations can be separated more reliably there.

In Example 2 and Example 3, the total number of optical material layers (including 2 spacer layers S1), 152, in the optical film 10 is much smaller than that in any of commercially available optical films manufactured according to the technique of Patent Literature 1. The optical film of the present invention, which requires a smaller number of optical material layers than does a conventional one, can be manufactured easily and less expensively.

The optical properties illustrated in FIG. 11, FIG. 12, FIG. 13, and FIG. 14 of the structures constructed by a number of optimized stacks differ from those (FIG. 9 and FIG. 10) of the structures constructed by a number of stacks designed by using the quarter-wave method. Therefore, the quarter-wave method and optimization algorithm may be used selectively as appropriate according to the object, required accuracy, and the like. With reference to FIG. 11, FIG. 12, FIG. 13, and FIG. 14, however, a method using the optimization algorithm is more preferred when designing a structure constituted by a number of stacks so that an optical property closely adapts to the emission spectrum of a given LED.

All of the structures pertaining to the spectrums illustrated in FIGS. 9 to 14 have a common property, i.e., the refractive indexes of the two optical material layers in a basic optical material layer pair have the following relationships: na–nb, x≤0.15, na=nb,y=nb,z.

Figure 15:
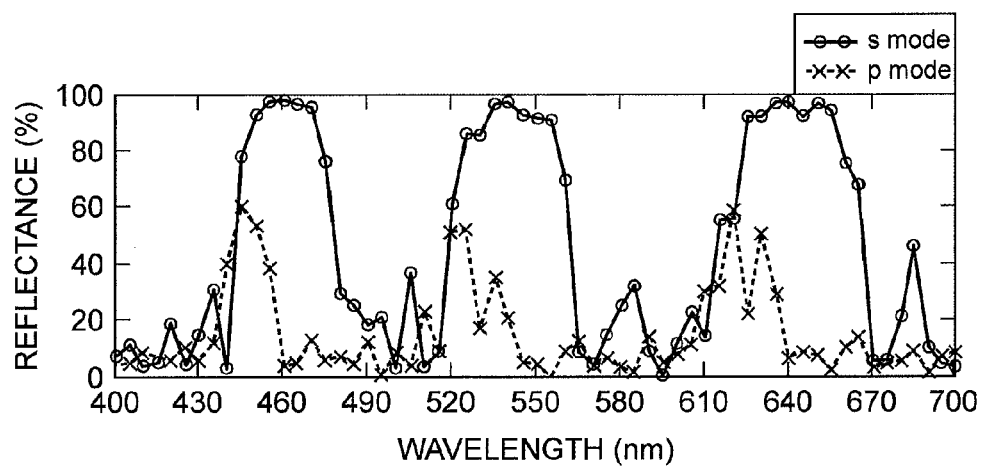
FIG. 15 is a chart illustrating a change in reflectance with respect to wavelength (spectrum) when the optical film is designed so that a refractive index condition of an anisotropic optical material layer is set more strictly.

However, stretching in one direction tends to change the refractive index in another direction in an actual manufacturing process. Therefore, while preferably na=nb,y=nb,z, there is a tendency that na≠nb,x≠nb,y≠nb,z. For investigating influences of such a case, optical properties of a multilayer structure in which a basic optical material layer pair is constituted by two kinds of actual materials, e.g., polycarbonate (PC) and PEN or co-PEN, were calculated. Approximate refractive indexes of these materials in a normal state are 1.59 (PC) and 1.64 (PEN or co-PEN). Assuming that stretching generates a refractive index difference of about 0.1 in the stretching direction, optical properties of a multilayer structure in which 152 layers are deposited on the substrate 20 having a refractive index of 1.5 can be calculated. The thickness of the optical material layers was calculated by the quarter-wave method. FIG. 15 illustrates a spectrum of wavelength dependency of such a multilayer structure. Here, na≠nb,y≠nb,z. However, FIG. 15 shows that, though the degree of polarization considerably drops at some wavelengths, it is usable in practice if a wavelength range is selected.

Various embodiments and examples of the present invention have been explained in the foregoing. However, without being restricted to the embodiments and examples mentioned above, the present invention can be modified in various manners within the scope not deviating from the gist thereof. For instance, as an example of target reflection spectrums, the reflection spectrum 51 is assumed to have reflection peak regions 51A in the blue wavelength range, the green wavelength range, and the red wavelength range in the examples of the above-mentioned embodiments and the like. However, as mentioned above, it will be sufficient if the reflection spectrum 51 has at least one reflection peak 51A including a reflection spectrum region 51Aa having a reflectance of 50% or higher and a wavelength width of 20 to 60 nm.

In the first and second optical material layers (first and second layers), the predetermined direction in which the refractive index difference occurs is not restricted to the polarization direction of the s-polarized light component in the incident light, but may be that of the p-polarized light component. The predetermined direction is not limited to the exemplified x direction as long as it is included within a plane (e.g., a plane orthogonal to the thickness direction) of the first and second optical material layers (first and second layers).

The number of stacks in the optical film can be the number of reflection peak regions in the target reflection spectrum or greater. Therefore, when there is one reflection peak region, the number of stacks is 1 or greater. When the number of stacks is the number of reflection peaks or greater, at least one stack can be allocated to each reflection peak region, whereby the reflection spectrum formed by the optical film is easier to conform to the target reflection spectrum. When the number of stacks is greater than the number of reflection peak regions, a reflection spectrum corresponding to a wavelength peak region may be achieved by two stacks, for example.

In the explanation concerning FIG. 6, the optical film 10 is arranged between the surface light source device 70 and the liquid crystal panel 61 separately from the surface light source device 70. However, the optical film 10 may be an element constituting the surface light source device 70.

In the mode illustrated in FIG. 6, a light guide plate is exemplified as surface-light-emitting element. However, the surface-light-emitting element may be a so-called diffuser. This makes a direct-type surface light source device or liquid crystal display device in which the light source unit is disposed on the rear side of the diffuser.

Various embodiments, examples, and modified examples explained in the foregoing can provide an optical film functioning to enhance luminance when used in a liquid crystal display device while having wavelength selectivity, and a surface light source device and a liquid crystal display device which include the optical film.

The invention claimed is:

1. An optical film comprising at least one stack having a plurality of basic pairs each constructed by stacking first and second layers having respective refractive indexes in a predetermined direction different from each other;
   wherein the number of stacks and the refractive index difference in the predetermined direction between the first layer and the second layer, thicknesses of the first and second layers, and number of basic pairs in each of the at least one stack are set such that a reflection spectrum by the at least one stack as a whole conforms to a target reflection spectrum; and
   wherein the target reflection spectrum is a spectrum having at least one reflection peak region including a spectrum region having a reflectance of at least 50% and a wavelength width of 20 to 60 nm in a reflection spectrum of a first polarized light component polarized in a specific direction in a wavelength range of 400 to 700 nm, while exhibiting a reflectance of 20% or less in a reflection spectrum of a second polarized light component polarized in a direction orthogonal to the polarization direction of the first polarized light component in the wavelength range of 400 to 700 nm.

2. The optical film according to claim 1, wherein, letting na,x be the refractive index in a direction parallel to the polarization direction of the first polarized light within a plane of the first layer, and
   nb,x be the refractive index in a direction parallel to the polarization direction of the first polarized light within a plane of the second layer,
   |Δn|=|nb,x−na,x| is at least 0.02 but 0.23 or less.

3. The optical film according to claim 2, wherein, letting na,y be the refractive index in a direction parallel to the polarization direction of the second polarized light within the plane of the first layer, and nb,y be the refractive index in a direction parallel to the polarization direction of the second polarized light within the plane of the second layer, $|nb,y-na,y|$ is less than 0.02.

4. The optical film according to claim 3, wherein, letting na,z be the refractive index in a thickness direction of the first layer, and nb,z be the refractive index in thickness direction of the second layer, $|nb,z-na,z|$ is less than 0.02.

5. The optical film according to claim 2, wherein, letting na,z be the refractive index in a thickness direction of the first layer, and nb,z be the refractive index in a thickness direction of the second layer, $|nb,z-na,z|$ is less than 0.02.

6. The optical film according to claim 1, wherein the number of basic pairs is 25 to 50.

7. The optical film according to claim 1, wherein the first and second layers have a thickness of 5 to 400 nm each.

8. The optical film according to claim 1, wherein the number of stacks is at least the number of reflection peak regions in the reflection spectrum of the first polarized light component in the target reflection spectrum.

9. The optical film according to claim 1, wherein the number of stacks is 1 to 3.

10. The optical film according to claim 1, wherein the reflection spectrum of the first polarized light in the target reflection spectrum has one reflection peak region within the range of 430 to 480 nm, one reflection peak region within the range of 510 to 560 nm, and one reflection peak region within the range of 600 to 660 nm.

11. A surface light source device comprising:

a light source unit;

a surface-light-emitting element for converting light from the light source unit into surface light and emitting the surface light from an exit surface part thereof;

a reflective part, disposed on the opposite side of the surface-light-emitting element from the exit surface part, for reflecting the light from the surface-light-emitting element to the surface-light-emitting element while changing a polarization state of the light; and the optical film according to claim 1, arranged on the exit surface part of the surface-light-emitting element, for receiving the surface light.

12. A liquid crystal display device comprising:

a light source unit;

a surface-light-emitting element for converting light from the light source unit into surface light and emitting the surface light from an exit surface part thereof;

a reflective part, disposed on the opposite side of the surface-light-emitting element from the exit surface part, for reflecting the light from the surface-light-emitting element to the surface-light-emitting element while changing a polarization state of the light;

the optical film according to claim 1, arranged on the exit surface part of the surface-light-emitting element, for receiving the surface light; and a liquid crystal panel arranged on the opposite side of the optical film from the surface-light-emitting element.

* * * * *